United States Patent
Giokas

(10) Patent No.: US 9,392,007 B2
(45) Date of Patent: Jul. 12, 2016

(54) SYSTEM AND METHOD FOR IDENTIFYING INFECTED NETWORKS AND SYSTEMS FROM UNKNOWN ATTACKS

(71) Applicant: Crypteia Networks S.A., Athens (GR)

(72) Inventor: Ioannis Giokas, Athens (GR)

(73) Assignee: Crypteia Networks S.A., Athens (GR)

( * ) Notice: Subject to any disclaimer, the term of this patent is extended or adjusted under 35 U.S.C. 154(b) by 29 days.

(21) Appl. No.: 14/531,450

(22) Filed: Nov. 3, 2014

(65) Prior Publication Data

US 2015/0128274 A1 May 7, 2015

Related U.S. Application Data

(60) Provisional application No. 61/899,373, filed on Nov. 4, 2013.

(51) Int. Cl.
*G06F 21/00* (2013.01)
*H04L 29/06* (2006.01)

(52) U.S. Cl.
CPC ........ *H04L 63/1416* (2013.01); *H04L 63/1425* (2013.01)

(58) Field of Classification Search
CPC combination set(s) only.
See application file for complete search history.

(56) References Cited

U.S. PATENT DOCUMENTS

| | | | |
|---|---|---|---|
| 7,681,235 B2 | 3/2010 | Chesla et al. | |
| 9,015,808 B1 * | 4/2015 | Koller | H04L 29/06857 726/4 |
| 2005/0235360 A1 | 10/2005 | Pearson | |
| 2006/0156404 A1 | 7/2006 | Day | |
| 2007/0162973 A1 | 7/2007 | Schneier et al. | |
| 2008/0052774 A1 | 2/2008 | Chesla et al. | |
| 2008/0148398 A1 * | 6/2008 | Mezack | G06F 21/55 726/22 |
| 2008/0196102 A1 | 8/2008 | Roesch | |
| 2009/0158435 A1 | 6/2009 | Milliken et al. | |
| 2010/0100961 A1 | 4/2010 | Scheidell | |
| 2010/0175132 A1 | 7/2010 | Zawadowskiy et al. | |
| 2010/0242114 A1 | 9/2010 | Bunker et al. | |

(Continued)

FOREIGN PATENT DOCUMENTS

WO    WO-2007/109721 A2    9/2007

OTHER PUBLICATIONS

Common Vulnerabilities and Exposures: The Standard for Information Security Vulnerability Names. "Exposures, The Standard for Information Security Vulnerability Names." url: http://cve.mitre.org (2007).

(Continued)

*Primary Examiner* — Ghazal Shehni
(74) *Attorney, Agent, or Firm* — Foley and Lardner LLP; Christopher J. McKenna

(57) ABSTRACT

Systems and method of the present disclosure are directed to a network security monitor. The monitor can receive logs of a second computer network indicative of a status of the second computer network determined by a monitoring agent executing on the second computer network. The monitor can generate indexed logs from the logs based on log format. The monitor can retrieving a list of threat indicators from a database based on a schema from a plurality of threat indicators received from a plurality of heterogeneous repositories via the first computer network. The monitor can compare the list of threat indicators with the indexed logs. The monitor can generate a report based on the comparing to identify a threat.

20 Claims, 14 Drawing Sheets

(56) References Cited

U.S. PATENT DOCUMENTS

2013/0081141 A1    3/2013  Anurag
2014/0157426 A1*   6/2014  Paek .................. G06F 21/6245
                                                           726/26

OTHER PUBLICATIONS

O'Hare, et al. "A Graph-Theoretic Visualization Approach to Network Risk Analysis." Visualization for Computer Security. Springer Berlin Heidelberg, 2008. pp. 60-67.
Iglun, et al. "State Transition Analysis: A Rule-Based Intrusion Detection Approach" IEEE Transactions on Software Engineering 21.3 (1995): pp. 181-199.
Payment Card Industry (PCI). "Data security standard." Attestation of Complian for Onsite Assessments—Service Providers, Version 2.0 (Oct. 2010).
International Search Report and Written Opinion for Application No. PCT/US2014/063672 dated Feb. 9, 2015.
International Search Report and Written Opinion for International Application No. PCT/US2014/047762 dated Nov. 14, 2014.
ISO, ISO. "IEC 27001 (2005) Information technology, security techniques, information security management systems requirements." ISO, Geneva (2005).
Jajodia, et al. "Topological analysis of network attack vulnerability." Managing Cyber Threats. Springer US, 2005, pp. 247-266.
Kumar, et al. "A Pattern Matching Model for Misuse Intrusion Detection." Purdue University, Computer Science Technical Report. (1994).
Mitnick, et al. The art of deception: Controlling the human element of security. John Wiley & Sons, 2001.
Mitropoulos, et al. "Incident Response Requirements for Distributed Security Information Management Systems." Information Management & Computer Security 15.3 (2007) pp. 226-240.
Mitropoulos, et al. "On Incident Handling and Response: A state-of-the-art approach." Computers & Security 25.5 (2006) pp. 351-370.
Noel, et al. "Advanced Vulnerability Analysis and Intrusion Detection through Predictive Attack Graphs." Critical Issues in C4I, Armed Forces Communications and Electronics Association (AFCEA) Solutions Series. International Journal of Command and Control (2009).
Patsos, et al. "Expanding Topological Vulnerability Analysis to Intrusion Detection through the Incident Response Intelligence System." Information Management & Computer Security 18.4 (2010): 291-309.
Valdes, et al. "Adaptive, Model-based Monitoring for Cyber Attack Detection." Recent Advances in Intrusion Detection. Springer Berlin Heidelberg, Jan. 2000.
Voas, et al. "Defining an Adaptive Software Security Metric from a Dynamic Software Failure Tolerance Measure." Computer Assurance, 1996. COMPASS'96, Systems Integrity. Software Safety. Process Security. Proceedings of the Eleventh Annual Conference on. IEEE, 1996.
US Notice of Allowance on U.S. Appl. No. 14/338,617 dated Feb. 1, 2016.
US Notice of Allowance on U.S. Appl. No. 14/338,617 dated Mar. 14, 2016.
US Office Action on U.S. Appl. No. 14/338,617 dated Jul. 30, 2015.

* cited by examiner

SYSTEM AND METHOD FOR IDENTIFYING INFECTED NETWORKS AND SYSTEMS FROM UNKNOWN ATTACKS

CROSS-REFERENCE TO RELATED APPLICATIONS

This application claims the benefit of priority under 35 U.S.C. §119 of U.S. Provisional Patent Application No. 61/899,373 filed Nov. 4, 2013, which is incorporated by reference herein in its entirety.

FIELD OF THE DISCLOSURE

This disclosure generally relates to systems and methods for a network security tool that identifies infected network infrastructure.

BACKGROUND OF THE DISCLOSURE

Computer networks or systems may have vulnerabilities that can be exploited by an attack or a threat. An exploited vulnerability can adversely affect the operation of the computer network, such as by slowing down the flow of data over the computer network, or preventing access to resources of the computer system.

BRIEF SUMMARY OF THE DISCLOSURE

The present disclosure relates generally to network security measures such as intrusion detection systems and intrusion prevention systems ("IDS/IPS"). In some embodiments, a network security tool identifies networks and systems that are infected via a previously unknown attack. The network security tool can receive log information from a protected network and threat indicator information from large information networks or third-party information networks such as those maintained by various entities, standards organizations, or corporations. The network security monitor can index the logs and the threat indicator lists using a schema, and then determine whether or not the network has been compromised by a threat, such as an advanced persistent threat ("APTs") that persists within networks for extended durations (e.g., several weeks, several months, hundreds of days, etc.) to gather and manipulate data of the network.

Corporations, companies, organizations, and private groups utilize computer networks to communicate, store information, and execute transactions or schedule services. Although computer networks can be created such that they are isolated, most often computer networks are created such that they are linked to the internet and thereby can utilize the internet to send information to more remote locations in the network. For example, a company utilizing a private network which is hosted on the internet can connect various different company locations all together into one network so that information, such as a word document, can be transmitted very quickly between locations which may be separated by fairly large geographical distances. Additionally, networks may be set up such that outside parties can interact with the network over the internet, as is the case in electronic commerce, one of the most common and widespread business practices taking place on the internet. In some situations it is also advantageous to allow external access such that a verified company employee or network member may access information stored on the network even when they are not at a company owned location. By enabling outside interaction with the network these advantages including but not limited to remote access and electronic commerce are enabled.

However, enabling outside access to a network also carries several disadvantages, including attacks from external sources attempting to damage the network or steal information from the network. Stealing information from a network can be particularly damaging to the owners of that network, especially if the information that was stolen is confidential or proprietary information like passwords lists or design plans. The stolen information can sometimes be used to carry out further malicious activities including but not limited to identity theft, further information theft, and asset theft. Such malicious activities can be costly for victims, and as a result, it is important that the chances of a network security breach be minimized.

In response to the threats against networks, networks can include and maintain some form of network security, such as firewalls, intrusion detection systems, intrusion prevention systems, and intrusion detection and prevention systems. Firewalls are in path security measures which are intended to control the flow of information into a network. This is accomplished by examining the incoming data packets and comparing them to a set of rules. Any offending packets, usually assumed to be malicious, are dropped by the firewall, thereby protecting the network that is behind the firewall. Firewalls monitor traffic which is incoming into the network and are capable of dropping data packets which may be malicious. Thus, the firewall may be capable of defending the network from a variety of external threats.

An intrusion detection system detects malicious attacks and then raises an alarm such that an authorized system administrator is notified of the attack and can take the appropriate actions to stymie it. An intrusion prevention system works to identify potential attacks and then automatically takes the appropriate action to disrupt or cease the attack. An intrusion prevention system may or may not notify system administrators when an attack is detected and thwarted by the system. An intrusion detection and prevention system (IDPS) combines these two functionalities, detecting potential attacks and both alerting system administrators and automatically moving to impede the attack. The IDPS may or may not notify system administrators if it is successful in stopping the attack, or may notify a system administrator if it fails to sufficiently stop the attack and other actions may need to be taken.

One type of threat to a secured network is known as Advanced Persistent Threat ("APT"). Advanced persistent threats are a serious concern for information holders for a number of different reasons. As opposed to a virus or brute force attack which infiltrate networks and cause large amounts of damage in addition to stealing information, APTs may remain undetected while in the network. When infiltrating a network, an APT silently gathers information while spreading its influence throughout the network such that it can gain even greater access to protected information found on the network. In some cases, an APT can remain in a network for hundreds of days (e.g., 100 to 400 days, or more), collecting and disseminating information during that time, without being detected or noticed. APTs may be directed to high value targets which allow them to steal valuable data. This stolen data can be used by malicious entities to further their own agendas. In an illustrative example, the APT lifecycle includes four general stages including preparation, infection, deployment, and maintenance. The persistent and recurring nature of APTs makes them a destructive and costly threat to deal with for large organizations who maintain extensive information networks. Some examples of organizations that may fall prey to APTs include but are not limited to the military, defense contractors, state, organizations, and energy companies.

Systems and methods of the present disclosure serve to detect and alert network administrators of the presence of an APT such that administrators may take the appropriate action to remove the APT and repair damage caused by the APT. A network security monitor of the present disclosure can identify networks and systems infected with attacks (known or unknown). The network security monitor can detect multiple types of APTs that are present in the network prior to the network security monitor being initiated, or APTs that may attempt to infiltrate the network after the integration of the network security monitor.

In some embodiments, the network security monitor is directed to detection of APTs. The network security monitor can utilize lists of malware, exploits, untrustworthy IP addresses, IPS signatures, and IDS signatures to detect threats. These lists can be updated (based on a time interval, periodically, in real-time, dynamically, continuously, etc.). In some embodiments, the network security monitor may update the lists via crowd sourcing. For example, crowd sourcing may refer to members of the online community contribute to one or more lists of malware, exploits, untrustworthy IP addresses, IPS signatures, and IDS signatures. The network security monitor may receive, retrieve, parse, or otherwise obtain the one or more lists updated via crowd sourcing, thereby improving network security monitor's coverage of APTs. The network security monitor may use, in some embodiments, techniques related to Knowledge Management, Semantics, Big Data technology and analytics to facilitate updating the list.

At least one aspect of the present disclosure is directed to a method of managing security on network infrastructure. In some embodiments, the method includes a log collector receiving a plurality of logs of a second computer network. The log collector is configured on a processor of a network security monitor to receive the plurality of logs via a first computer network. The plurality of logs are indicative of a status of the second computer network, and the status can be determined by a monitoring agent executing on the second computer network. The method can include a log indexer generating indexed logs from the plurality of logs based on log format. The log indexer can also be configured on the network security monitor. The method can include the network security monitor retrieving a list of threat indicators from a database. The data base can store the list of threat indictors using a schema. The list of threat indicators can be based on a plurality of threat indicators received from a plurality of heterogeneous repositories via the first computer network. The method can include a log correlation engine configured on the network security monitor comparing the list of threat indicators with the indexed logs. The method can include a report engine configured on the network security monitor generating a report based on the comparing to identify a threat.

In some embodiments, the method may include an aggregator receiving one or more threat indicators from a plurality of heterogeneous sources via the first computer network. The method can include a normalizer using the schema to transform the one or more threat indicators to the list of threat indicators. This list of threat indicators can include structured information configured for use by the correlation engine.

In some embodiments, the method may include an aggregator of the network security monitor obtaining a first configuration for accessing a first repository via the first computer network. The method may include the aggregator obtaining a second configuration for accessing a second repository via the first computer network. The method may include the aggregator using the first configuration to establish a first connection with the first repository via the first computer network. The method may include the aggregator using the second configuration to establish a second connection with the second repository via the first computer network. The method may include the network security monitor updating, based on the schema, the list of threat indicators based on one or more threat indicators received from at least one of the first repository or the second repository.

In some embodiments, the method may include the network security monitor receiving, via the first computer network, a first threat indicator from a first repository in a first format. The method may include the network security monitor receiving, via the first computer network, a second threat indicator from a second repository in a second format. The first repository may be different from the second repository, and the first format may be different from the second format. The method may include the network security monitor transforming the first threat indicator and the second threat indicator to the list of threat indicators based on the schema.

In some embodiments, the method may include the network security monitor initiating the comparing by the log correlation engine response to receiving at least one of an update to the list of threat indicators or a new log of the second computer network.

In some embodiments, the method may include the log correlation engine searching for a correlation between the indexed logs of the second computer network. The method may include the log correlation engine identifying a match based on the correlation between the indexed logs and the list of threat indicators.

In some embodiments, the method may include the log correlation engine identifying a portion of the plurality of logs as corresponding to a first type of the log format. The method may include the log correlation engine identifying one or more threat indicators of the list of the threat indicators corresponding to the first type. The method may include the log correlation engine comparing the portion of the plurality of logs with the one or more threat indicators to identify a match.

In some embodiments, the method includes the log correlation engine comparing historical logs and current logs with the one or more threat indicators to identify a match.

In some embodiments, the method includes the log correlation engine initiating, instructing, or indicating to the report engine to generate the report responsive to identifying a match based on the comparing.

In some embodiments, the second computer network is a secure network configured to block unauthorized access. In some embodiments the plurality of logs include a compilation of logs generated by the monitoring agent, the monitoring agent including at least one of an antivirus tool, a network security element, an intrusion prevention system, or an intrusion detection system. In some embodiments, the plurality of logs include at least one of a general system log, a network security log, an intrusion prevention system log, an intrusion detection system log, or an antivirus application log. In some embodiments, the log format include at least two of a threat log mapping, a traffic log mapping, an email log mapping, a performance log mapping, an AAA log mapping, a VPN log mapping, or an access control log mapping.

In some embodiments, the method includes the network security monitor inputting, via an interface, the indexed logs in memory configured with a data structure corresponding to the indexed logs. In some embodiments, the method includes the network security monitor transmitting the report via the first computer network to an administrator device associated with the second computer network.

Another aspect of the present disclosure is directed to a system for management of security on network infrastructure. In some embodiments, the system includes a log collector configured on a processor of a network security monitor. The log collector is configured to receive, via a first computer network, a plurality of logs of a second computer network. The plurality of logs are indicative of a status of the second computer network determined by a monitoring agent executing on the second computer network. The system includes a log indexer configured on the network security monitor. The log indexer is configured to generate indexed logs from the plurality of logs based on log format. The network security monitor is further configured to retrieve a list of threat indicators from a database based on a schema from a plurality of threat indicators received from a plurality of heterogeneous repositories via the first computer network. The system includes a log correlation engine configured with a heuristic technique to perform a comparison of the list of threat indicators with the indexed logs. The system includes a report engine configured on the network security monitor to generate a report based on the comparison to identify a threat.

In some embodiments, the system includes an aggregator and a normalizer. The aggregator may be configured to receive one or more threat indicators from a plurality of heterogeneous sources via the first computer network. The normalizer may be configured to use the schema to transform the one or more threat indicators to the list of threat indicators. The list of threat indicators can include structured information configured for use by the correlation engine.

In some embodiments, the system includes an aggregator configured to obtain a first configuration for accessing a first repository via the first computer network. The aggregator can be further configured to obtain a second configuration for accessing a second repository via the first computer network. The aggregator can be further configured to use the first configuration to establish a first connection with the first repository via the first computer network. The aggregator can be further configured to use the second configuration to establish a second connection with the second repository via the first computer network. The network security monitor can be further configured to update, based on the schema, the list of threat indicators based on one or more threat indicators received from at least one of the first repository or the second repository.

In some embodiments, the network security monitor is further configured to receive, via the first computer network, a first threat indicator from a first repository in a first format. The network security monitor can be further configured to receive, via the first computer network, a second threat indicator from a second repository in a second format. The first repository can be different from the second repository and the first format can be different from the second format. In some embodiments, the network security monitor transforms the first threat indicator and the second threat indicator to the list of threat indicators based on the schema.

In some embodiments, the log correlation engine is further configured to identify a portion of the plurality of logs as corresponding to a first type of the log format. The log correlation engine can be further configured to identify one or more threat indicators of the list of the threat indicators corresponding to the first type. The log correlation engine can be further configured to compare the portion of the plurality of logs with the one or more threat indicators to identify a match.

In some embodiments, the log correlation engine is further configured to initiate responsive to identifying a match based on the comparing, the report engine to generate the report.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for a network security tool.

A. Computing and Network Environment

Figure 1A:
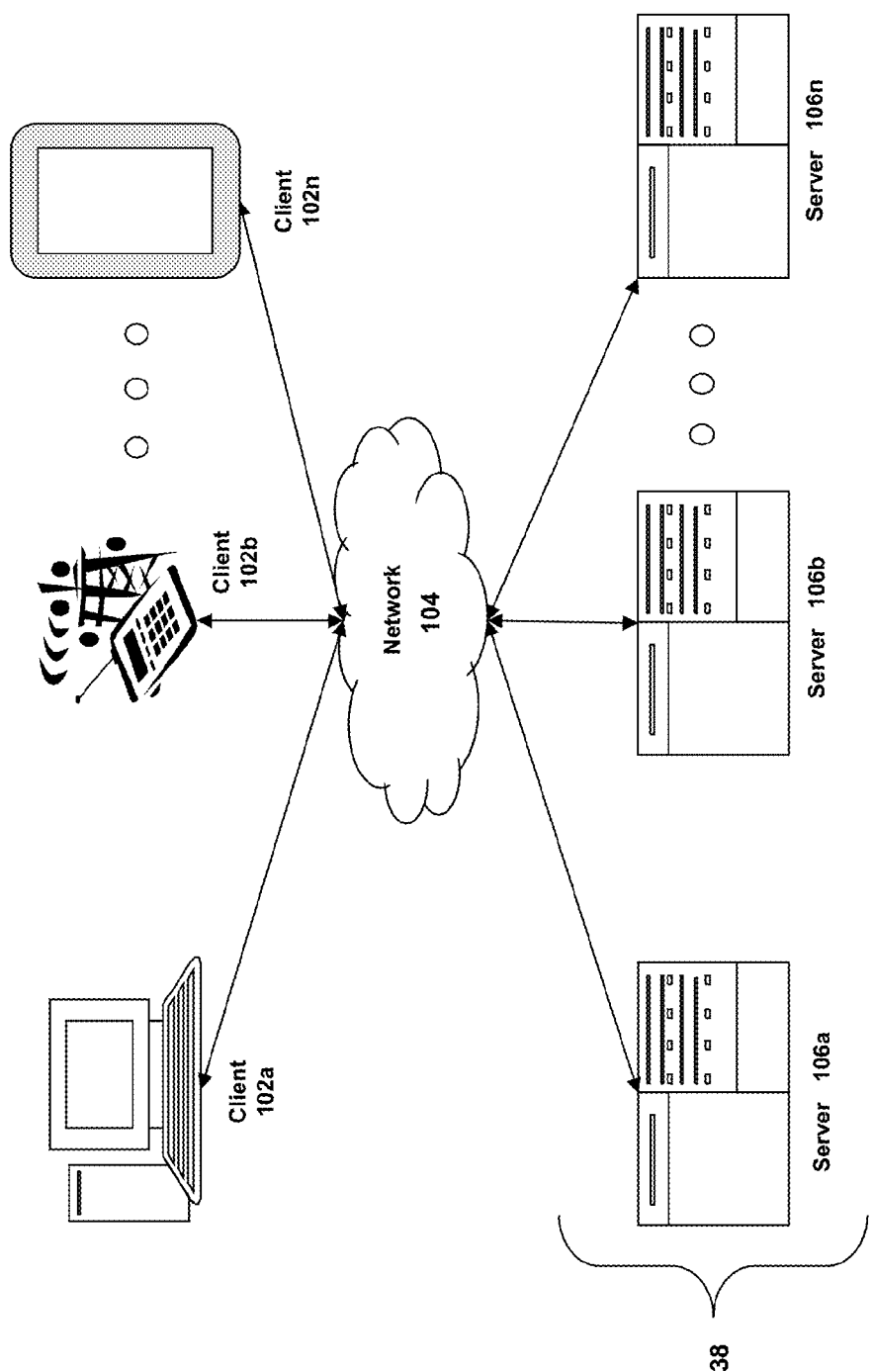
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
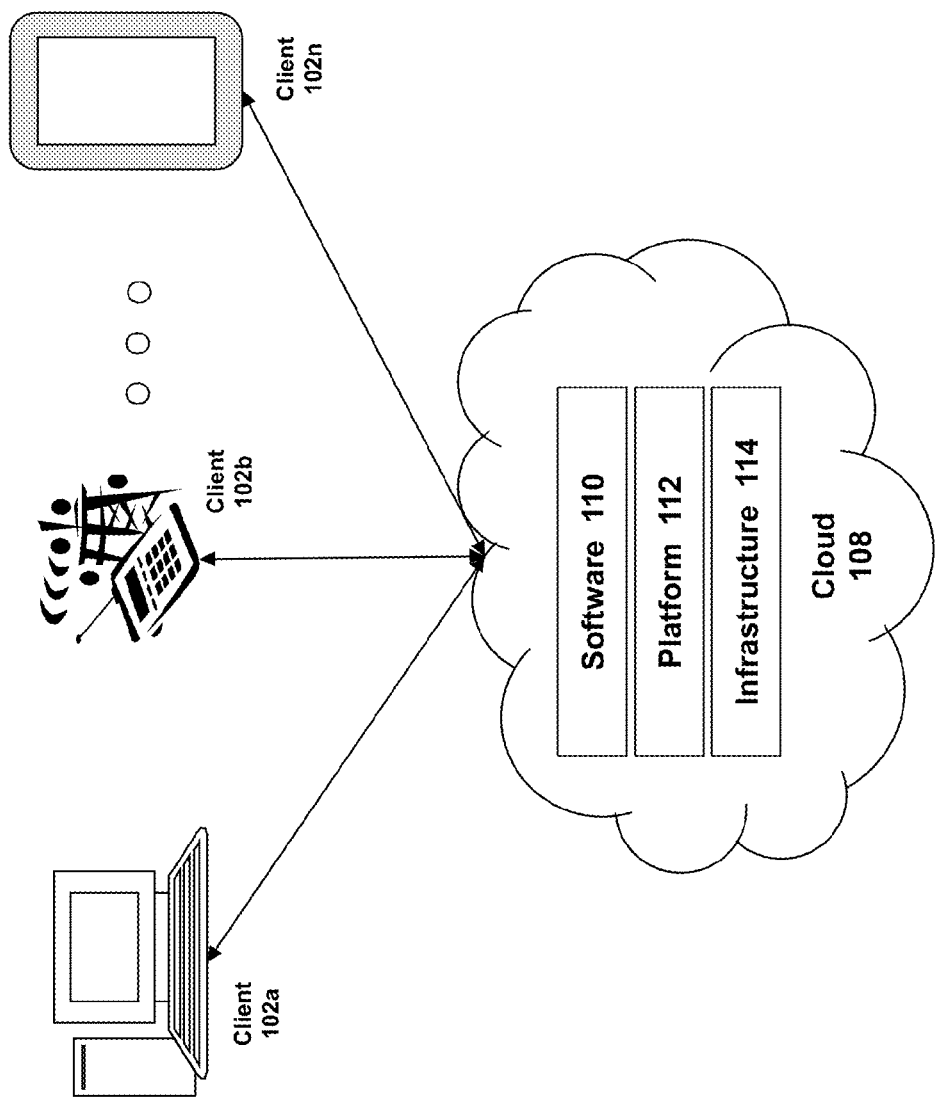
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
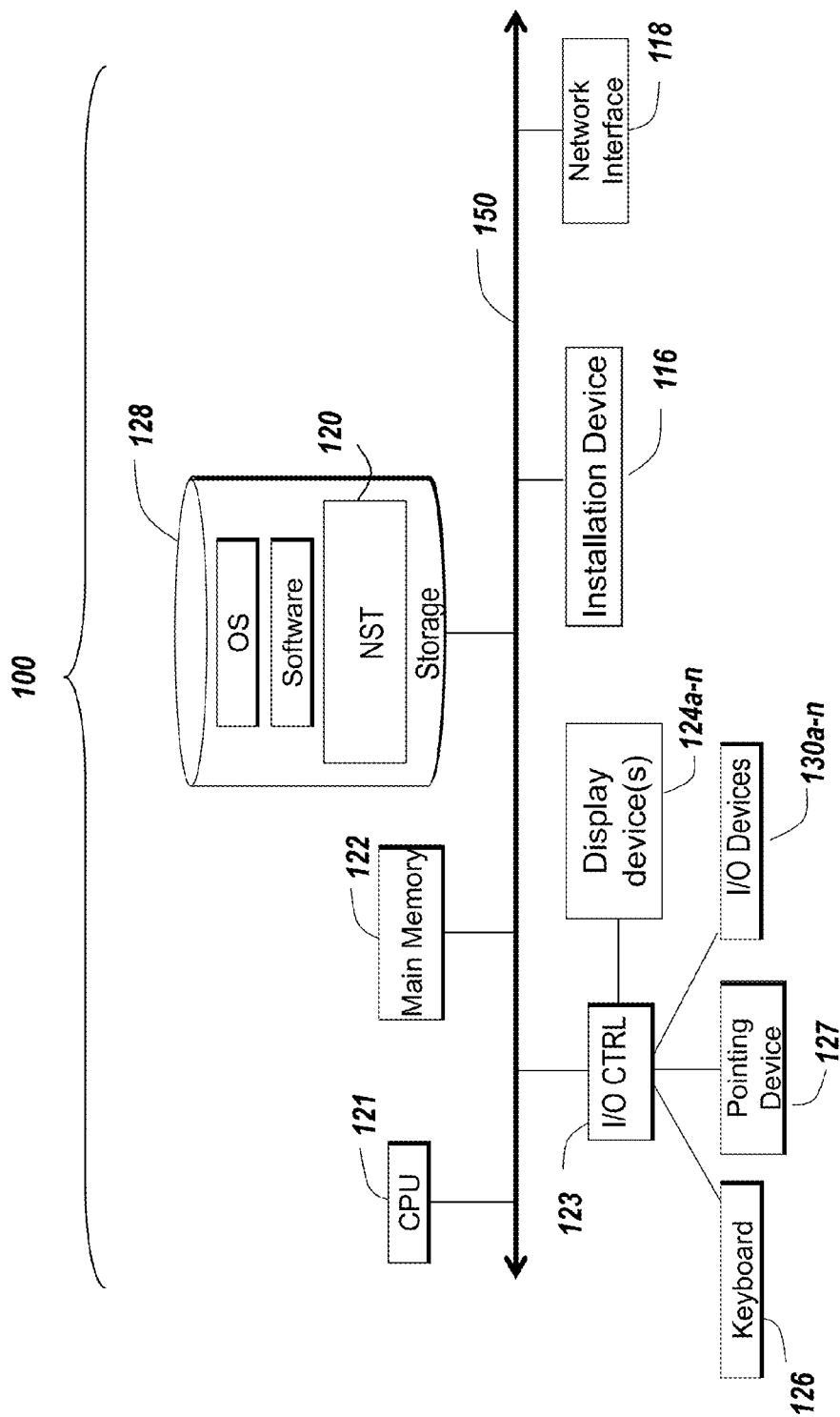
FIGS. 1C and 1D are block diagrams depicting embodiments of computing devices useful in connection with the methods and systems described herein.
Figure 1D:
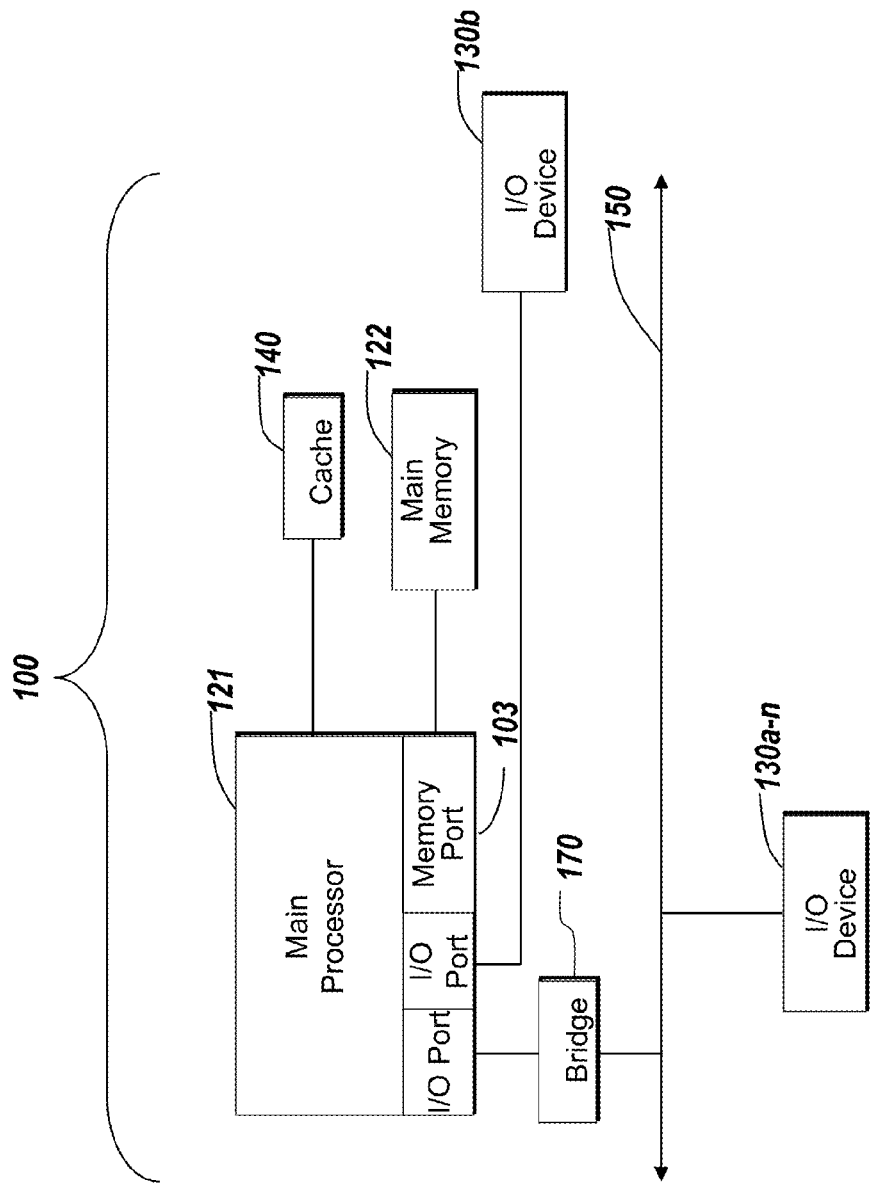

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a network security monitor (NSM) 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (Fe-RAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the network security monitor. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/ MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Network Security Monitor

Systems and method of the present disclosure are directed to identifying networks and systems that are infected with an unknown attack. In an illustrative example, a network security monitor of the present disclosure can provide network security by detecting threats known as advanced persistent threats (APTs). APTs can remain within networks for an extended duration, (e.g., several days, weeks, months, or hundreds of days). During this time, APTs can damage the network, access data, retrieve data, resulting in large amounts of network damage and information theft.

An illustrative system of the present disclosure interacts with or includes a protected network, a network security monitor (or APT intelligence platform), a database, and a communications method. The protected network may represent an information exchange or storage network, which is being protected by the network security monitor. The network security monitor can alert network operators of the existence of threats present within the protected network, or attempts made by external forces to infiltrate the network. Thus, the network security monitor of the present disclosure can protect the protected network by keeping network operators aware of APTs that currently are, or historically were, attempting to compromise the security of the protected network.

The network security monitor or APT intelligence platform detects APTs, which are currently in the network, or are currently attempting to infiltrate the network. The network security monitor or APT intelligence platform may include a computing device, server, one or more processors, an application or a specialized computer algorithm, which combines or invokes a plurality of different functionalities for the detection of APTs on information networks. The APT intelligence platform may include one or more of the following components; a log collector, a log indexer, a log correlation engine, and a report engine. The log collector may receive system logs from the protected network. The APT intelligence platform (or network security monitor) can analyze system logs which may be generated by the protected network. The system logs may be provided to the APT intelligence platform via a secure network connection.

The network security monitor may include a log indexer that organizes system logs provided to the network security monitor by the protected network. The system logs may include different types of logs generated by the protected including, but not limited to, general system logs, network security logs such as those generated by IPSs and IDSs, and logs generated by anti-virus applications. These logs are organized by the network security monitor so the organized logs can be compared to extensive lists of threat indicators in order to determine whether or not the protected network is currently infected by an APT. By indexing the logs provided to the network security monitor, the system can achieve greater efficiency by comparing logs to the appropriate lists of potential threat indicators, thereby reducing the amount of computing resources consumed by the network security monitor during operation.

The network security monitor may include a log correlation engine that takes the logs provided by the protected network and indexed by the log indexer, and compares those logs to the lists of threat indicators stored on the database. The log correlation engine can include a specially designed heuristic algorithm configured to simultaneously search through the logs provided by the protected network and compare them to the lists of threat indicators. The log correlation engine may searches for similarities or correlations between the logs of the protected network and the threat indicator lists.

When the log correlation engine identifies a similarity or correlation, the log correlation engine instructs or initiates the report engine to generate a report of the threat. This report may be provided to network operators (e.g., for display on a display device communicatively coupled to the network security monitor). The report engine is responsible for generating and compiling reports, which indicate to the network operators that an APT may be present within their network. The report engine generates the report based on correlations and similarities found by the log correlation engine, and illustrates these similarities within the report such that the network operators can determine or identify the nature of the APT potentially be affecting the protected network. The report engine can delivers the report to the network operators via the protected or external network.

The network security monitor can include or have access to a database. The database may be stored in memory, a hard drive, storage, or other computer readable medium. In addition to storing the logs, which are generated and delivered to the network security monitor via the protected network, the database can include threat indicator lists. The log correlation engine can use the threat indicator lists to detect potential APTs. The log correlation engine can use the threat indicator lists in a comparative function against the system logs provided by the network. Thus, the log correlation engine can identify potential APTs based upon their behavior and the patterns they create within the system; patterns, which may be otherwise undetectable, but can be revealed by the analysis performed by the correlation engine. The threat indicator list can include one or more categories that indicate APTs in different ways or from different perspectives, or different types of APTs. For example, the threat indicators can include the following three categories: IP addresses, malware and malicious code samples, and IPS signatures. The log correlation can use the threat indicators to determine a presence of an APT within the protected network.

Figure 9:
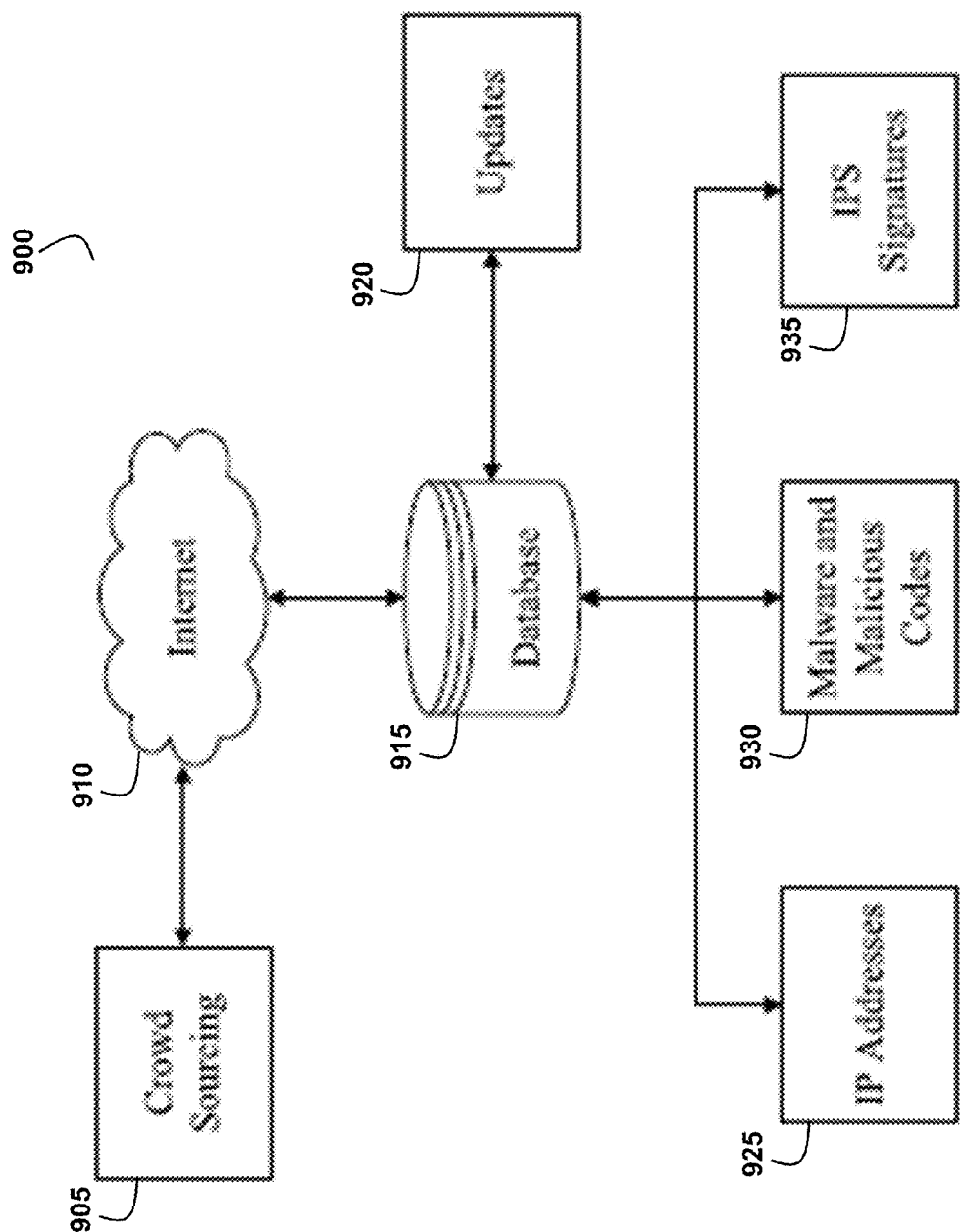
FIG. 9 is a flow chart depicting an embodiment of a system that updates a database through crowd sourcing and official updates.

The network security monitor can update the threat indicator lists stored on the database. The network security monitor may crowd source threat information via an external network (e.g., via the Internet) to update the threat indicator lists. By crowd sourcing the threat information, the network security monitor can use threat identification lists contributed by the public that may have more recent and relevant information for the detection of various different APTs, as illustrated in FIG. 9. Thus, the network security monitor can access (e.g., via an Internet connection) private and open source threat intelligence repositories including but not limited to IP addresses, malware and malicious code samples, and IPS signatures. The network security monitor can aggregate and store the threat intelligence in a database infrastructure (e.g., file server, file system) using a threat intelligence schema/format for organizing and making the aggregated threat intelligence manageable and maintainable. The network security monitor may normalize the threat intelligence using the schema.

The schema/format used by the network security monitor organizes the aggregated threat intelligence and makes the threat intelligence database manageable and maintainable. The threat intelligence schema/format can be applied to threat indicators aggregated from different private and open source threat intelligence repositories including, e.g., IP addresses, malware and malicious code samples, and IPS signatures to be structured and expressed to get consumed and utilized by the log correlation engine. A normalizer of the network security monitor can use the threat intelligence schema/format to transform threat intelligence gathered by the aggregator of the system to structured information ready to be used by the log correlation engine.

In an illustrative example, a threat intelligence aggregator of the network security monitor can different private and open source threat intelligence repositories via the Internet using protocols such as HTTP, FTP, P2P, etc. To make such connections, the aggregator can be configured with configuration details for accessing the repository. The configured details may include URLs of a repository, information transfer protocol, and/or authentication credentials specified by repositories vendors. Once the aggregator aggregates threat intelligence, the network security monitor may pass the aggregated threat intelligence to the normalizer. The normalizer can be aware of the threat intelligence schema/format and transforms the aggregated generic threat intelligence to structured information ready for use by the log correlation engine. As new threat intelligence repositories become available to the aggregator, the schema/format may be revised or updated to allow the intelligence coming from each new repository to be formatted properly by the normalizer. The network security monitor may then store the normalized threat intelligence in the threat intelligence database.

The network security device can use one or more communications methods to send a report generated by the report engine to network operators of the protected network or other entities. The communications methods may include any type of modern communications such as electronic mail, instant messaging, SMS, notifications, push, alerts, badges, icons, etc. The network operators may receive the report through a variety of different modern computing devices, including but not limited to tablet computers, smart phones, desktop computers, notebook computers, mobile telecommunications devices, smart watches, etc.

Figure 2:
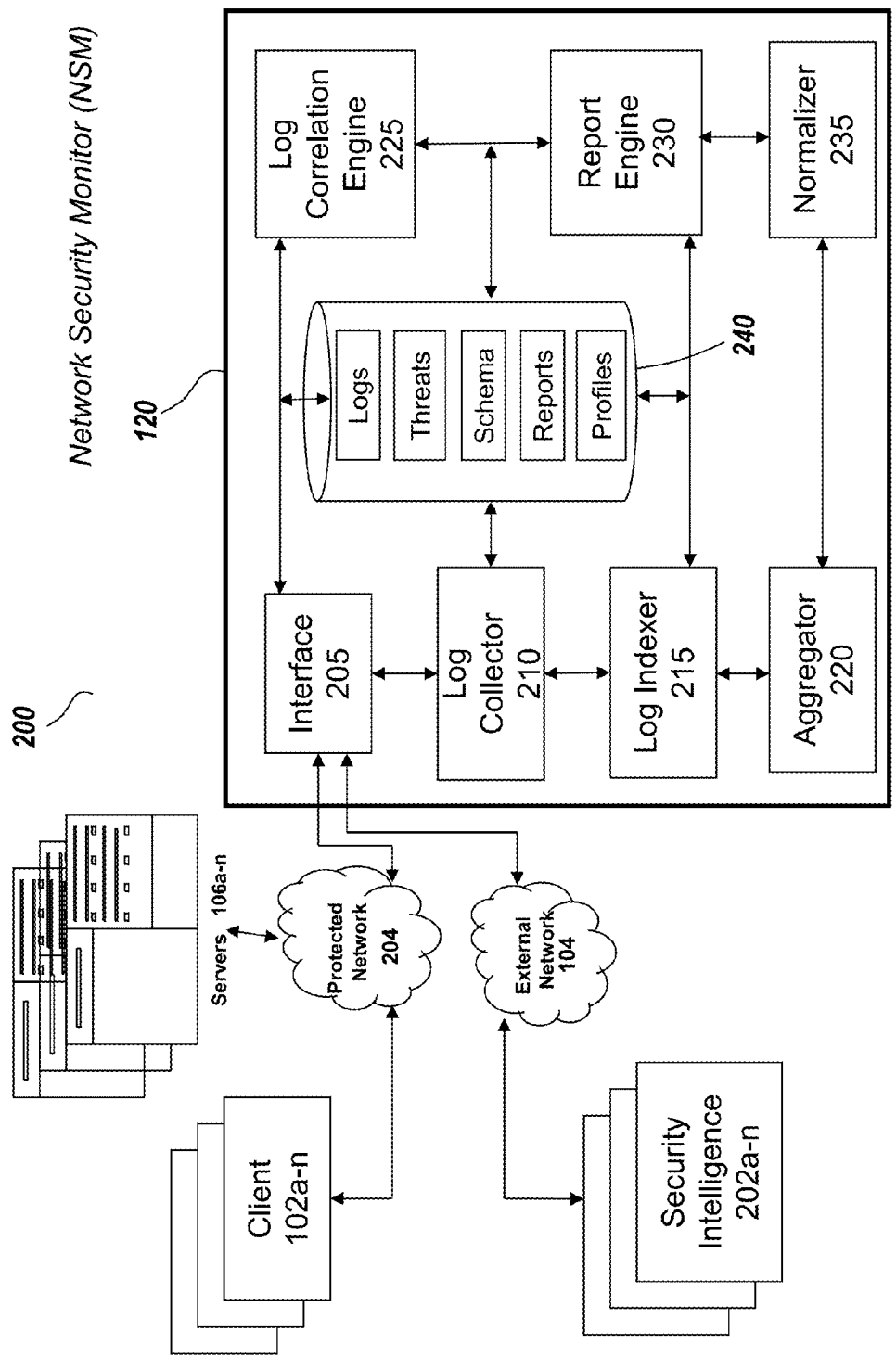
FIG. 2 is a block diagram depicting an embodiment of a system comprising a network security monitor.

Referring now to FIG. 2, a block diagram depicting an embodiment of a system 200 comprising a network security monitor is shown. In brief overview, the system 200 includes a network security monitor 120 ("NSM") that can receive and/or transmit data via a protected network 204 and/or an external network 104. The system may include one or more clients 102*a-n* and/or one or more servers 106*a-n* that access the protected network 204. The system may include security intelligence repositories 202*a-n*, such as third-party threat intelligence providers, crowd sourced threat intelligence, etc. The network security monitor 120 can include an interface 205 that access the protected network 204 and external network 104. The interface 205 may also facilitate interactions or communication between one or more modules, engines, or databases of the network security monitor 120. The network security monitor 120 may include a log collector 210 that obtains logs for the protected network. The network security monitor 120 may include a log indexer 215 that indexes the logs obtained by the log collector 210. The network security monitor 120 may include a log correlation engine 225 that compares the indexed logs with threat intelligence stored in the database 240. The database 240 may include stored logs, threat intelligence, schema, reports, and profiles (e.g., configuration details for accessing a repository). The network security monitor may include an aggregator 220 that obtains threat intelligence information from one or more repositories and a normalizer 235 that normalizes the aggregated threat intelligence. The network security monitor may include a report engine 230 that generates a report based on whether or not at threat is detected in the protected network, and communicates the report to a client 102*a-n* via the protected network 204 or other entity.

The network security monitor 120, interface 205, log collector 210, log indexer 215, aggregator 220, log correlation engine 225, report engine 230, normalizer 235 and database 240 may each include one or more processing units or other logic devices such as programmable logic array engines, modules, or circuitry designed and constructed to facilitate managing security on a network infrastructure.

In further detail, the network security monitor 120 includes an interface 205. The interface 205 can be designed and constructed to communicate via a protected network 204 or an external network 104. A protected network 204 may refer to a private network, e.g., a network that the network security monitor 120 is attempting to monitor or protect. For example, this network may refer to an internal network, or intranet, of a company, organization, university, or other entity. The interface 205 may be designed and constructed to communicate via an external network 104, such as the World Wide Web or Internet. The interface 205 may facilitate interaction or communication between one or more modules or components of, or associated with, the tool 120, such as the log collector 210, log indexer 215, aggregator 220, log correlation engine 225, report engine 230, normalizer 235 and database 240. The interface 205 may directly interface with the modules or networks 104 and 204, or the interface may communicate with the modules or networks via an intermediary device, application program interface, input/output device, etc.

The network security monitor 120 may include a log collector 210 designed and constructed to obtain logs. The log collector 210 may receive the logs via interface 205 or another interface of the log collector 210. The log collector 210 can receive the logs securely from the protected network 204 (e.g., an encrypted network, password protected network, access restricted network, time restricted network, etc.). The log collector 210 may receive, request, retrieve or obtain logs from the protected network 204 that indicate a status of the protected network. The logs may indicate network activity on the protected network 2014 including, e.g., threats, traffic, email, performance authentication, authorization and accounting (AAA), VPN, and access control information. Each log may have a log identifier and indicate information associated with the network activity such as device identifiers, time stamps, domains, level of severity of the log event, source port of the session, source internet protocol (IP) of the session, destination IP of the session, reference URL, etc. Tables 1-8 are an illustrative example of the type of information that can be obtained or determined by the log collector 210.

The log collector 210 can obtain the logs based on a time interval. In some embodiments, the log collector 210 may continuously receive logs in real-time, e.g., as logs are created. In some embodiments, the log collector 210 may receive the logs based on a time interval or in a batch process (e.g., multiple logs stored in one or more data files). For example, the log collector 210 may receive logs hourly, every 12 hours, every 24 hours, weekly, every two weeks, or any other time interval set by an administrator of the network security monitor 120 that facilitates managing the security of the protected network 204. In some embodiments, the network security monitor 120, e.g., via the log collector 210, may receive logs responsive to a request for logs.

The log collector 210 may request logs from an agent executing on the protected network 204, such as a monitoring agent. A monitoring agent can execute on a server 106a-n of the protected network 204, or client 102a-n. The monitoring agent may include, for example, an antivirus tool, a network security element, an intrusion prevention system, or an intrusion detection system. In some embodiments, the log collector 210 may obtain network information or logs from a vulnerability assessment tool (e.g., Open Vulnerability Assessment System ("OpenVAS"), which may include a framework of several services and tools offering a vulnerability scanning and vulnerability management solution. The monitoring agent may create one or more types of logs including, e.g., general system logs, network security logs, intrusion prevention system logs, intrusion detection system logs, or an antivirus application log.

The logs received by the log collector 210 may be in any format that provides information on network activity of the protected network 204. In some embodiments log files may include plain text files, comma-delimited files, binary files, spreadsheets, etc. For example, a text file may be comma-delimited to reflect headers for each column in the log file. In some embodiments, depending on the monitoring agent, the monitoring agent may create a log folder that contains a series of logs files, one file for each day of log entries. The log files may be named MMDDYYYY.log, where MMDDYYYY indicates the date of the log entries.

In some embodiments, the monitoring agent may store log files in a predetermined directory of a server or client of the protected network. The log collector 210 may access the predetermined directory based on a time interval (e.g., periodically, upon request, or some other time interval) to determine whether there are new or updated logs that can be retrieved. In some embodiments, the log collector 210 may retrieve or receive the logs, and store the logs in database 240. The log collector 210 may store all previous logs, aggregate logs based on type, or delete the logs after a time period (e.g., 24 hours, 48 hours, a week, month, year, etc.).

The network security monitor may include a log indexer 215 designed and constructed to organize the logs obtained by the log collector 210. The logs may include different types of logs generated by the protected including, but not limited to, general system logs, network security logs such as those generated by IPSs and IDSs, and logs generated by anti-virus applications. The log indexer 215 can organize the logs in a manner that facilitates comparing the logs to extensive lists of threat indicators in order to determine whether or not the protected network is currently infected by an APT. By indexing the logs provided to the network security monitor, the network security monitor 120 can achieve greater efficiency by comparing logs to the appropriate lists of potential threat indicators, thereby reducing the amount of computing resources consumed by the network security monitor during operation.

The log indexer 210 may receive the logs directly from the log collector 210, or may access the database 240 to obtain the logs after the log collector 210 stores the logs in the database 240. The log indexer may index the logs based on threat indicators. The log indexer 215 is configured with a log normalizations schema that allows the log indexer to organize different types of logs obtained from different types of devices, collectors, tools, applications, or monitoring agents. Since each monitoring agent may use a different type of log representation, indexing all the received logs using a common log format or schema can improve the efficiency of the log correlation engine 225.

The log indexer 210 can parse, analyze, or otherwise process received logs to determine a type of log (e.g., threat log, email log, traffic log, authentication log, etc.), and one or more parameters or fields associated with the log. The log indexer 210 can then index the log based on the type of log (e.g., threat log), and organize the data or parameters associated with the log using a log format or schema. The log indexer 215 may index historical logs that were not previously indexed, as well as new logs received by the log collector 210. The log indexer 215 may index logs in real-time as they arrive, or the log indexer 215 may index logs in a batch process run based on a time interval (e.g., hourly, daily, weekly, or some other time period that facilitates managing security of the network).

The following tables 1-8 illustrate embodiments of a log format or schema used by the log indexer 215 to organize, index, or normalize the logs received by the log collector 210 or stored in the database 240. The log indexer 215 may use different formats or schema based on the type of log. The log indexer 215 may apply this format or schema for all received logs corresponding to the same type. For example, table 1 illustrates an embodiment of a log format or schema for mapping received logs to indexed threat logs; table 2 illustrates an embodiment of a log format or schema for mapping received logs to indexed traffic logs; table 3 illustrates an embodiment of a log format or schema for mapping received logs to indexed email logs; table 4 illustrates an embodiment of a log format or schema for mapping received logs to indexed performance logs; table 5 illustrates an embodiment of a log format or schema for mapping received logs to indexed AAA (authentication, authorization and accounting) logs; table 6 illustrates an embodiment of a log format or schema for mapping received logs to indexed VPN logs; table 7 illustrates an embodiment of a log format or schema for mapping received logs to indexed access control logs; table 8 illustrates an embodiment of a log format or schema for that are used for mapping one or more types of logs.

TABLE 1

Threat Log Mapping

| Field Name | Field Description |
|---|---|
| @timestamp | Time stamp of the event |
| Devname | ID of the device |
| Devid | Name of the device |
| Domain | Name of the virtual device |
| Logid | ID of the event |
| Type (threat) | Type of the event |
| Subtype (anomaly, virus, signature) | Subtype of the event |
| level | Severity of the event |
| srcport | Source port of the session |
| srcip | Source IP of the session |
| srcintf | Source interface of the session |
| dstintf | Destination interface of the session |
| dstip | Destination IP of the session |
| dstport | Destination port of the session |
| service | Service of the session |
| sessionid | Session ID |
| policyid | Identification number of the policy |
| identidx | Authentication policy ID |
| user | Identified user of the session |
| group | Identified user's group of the session |
| profile | Security profile that recognizes the threat |
| proto | |
| Status (blocked, passthrough, monitored, analytics, detected, dropped, reset) | Action performed for the current threat |
| attackname | Name of the threat |
| ref | Reference URL |
| file | Name of the file infected |
| checksum | Checksum of the file infected |
| quarskip | Quarantine action |
| url | Source URL of the threat (malware) |
| from | Sender's email address in case of threat through email |

TABLE 1-continued

Threat Log Mapping

| Field Name | Field Description |
|---|---|
| to | Recipient's email address in case of threat through email |
| severity | Severity of the threat |
| count | Number of packets |
| attackid | Identification of the threat |
| incidentserialno | Incident serial number |

TABLE 2

Traffic log mapping

| Field Name | Field Description |
|---|---|
| @timestamp | Timestamp of the event |
| Devname | Name of the system |
| Devid | Unique identification number of the system |
| Logid | Log identification number |
| Type | Type of the event value: traffic |
| Subtype | Subtype of the event |
| Domain | Virtual domain of the system |
| Level | Severity of the event |
| Srcport | Source port of the session |
| Srcip | Source IP of the session |
| Srcintf | Source interface of the session |
| Dstintf | Destination interface of the session |
| Dstip | Destination IP of the session |
| Dstport | Destination port of the session |
| Srccountry | Source country |
| Dstcountry | Destination country |
| Policyid | Identification number of the security policy traffic passthrough |
| Identidx | Identify-based policy identification number |
| Sessionid | Serial number of the session |
| Service | Service of the session |
| User | Identified user of the session |
| group | Identified user's group of the session |
| applist | Application sensor that recognizes the application |
| status | Status of the traffic session |
| appid | Identification number of the application |
| app | Name of the application |
| appcat | Category of the application |
| duration | Duration of session in seconds |
| sentbyte | Number of sent bytes |
| rcvdbyte | Number of received bytes |
| totalbytes | Total bytes |
| sentpkt | Number of sent packets |
| rcvdpkt | Number of received packets |
| trandisp | Type of NAT |
| tranip | Translated IP in NAT mode |
| transip | Translated source IP in NAT mode |
| tranport | Translated port |
| transport | Translated source port |
| proto | IP protocol |

TABLE 3

Email log mapping

| Field Name | Field Description |
|---|---|
| @timestamp | Timestamp of event |
| Devid | ID of the device |
| Devname | Name of the device |
| Domain | Name of the virtual device |
| Logid | ID of the event |
| Type (email) | Type of the event |
| Subtype (spam regular) | Subtype of the event |
| level | Severity of the event |
| srcport | Source port of the session |

TABLE 3-continued

Email log mapping

| Field Name | Field Description |
|---|---|
| Srcport | Source port of the session |
| Srcip | Source IP of the session |
| Srcintf | Source interface of the session |
| Dstintf | Destination interface of the session |
| Dstip | Destination IP of the session |
| Dstport | Destination port of the session |
| service | Service of the session |
| sessionid | ID of the session |
| policyid | ID of the policy |
| identidx | ID of the identification policy |
| user | Name of the user |
| group | Name of the group to which user belongs |
| profile | Name of the security profile |
| Status (detected, blocked, exempted) | Status of the action taken |
| from | Sender of the email |
| to | Recipient of the email |
| msg | Information related to the spam mechanism |
| subject | Subject of the email |
| size | Size of the email |
| cc | CC of the email |
| Attachment (yes, no) | Whether the email includes an attachment |

TABLE 4

Performance log mapping

| Field Name | Field Description |
|---|---|
| @timestamp | Timestamp of event |
| Devid | ID of the device |
| Devname | Name of the device |
| Domain | Name of the virtual device |
| Logid | ID of the event |
| Type (perf) | Type of the event |
| Subtype (sys) | Subtype of the event |
| cpu | Percentage of CPU usage |
| mem | Percentage of memory usage |
| totalsession | Total number of system's sessions |

TABLE 5

AAA (authentication, authorization and accounting) log mapping

| Field Name | Field Description |
|---|---|
| @timestamp | Timestamp of the event |
| Devname | Unique identification number of the system |
| Devid | Log identification number |
| Logid | Type of the event (value: traffic) |
| Type (aaa) | Subtype of the event |
| Subtype (authen, author, acc) | Virtual domain of the system |
| domain | Virtual domain of the system |
| level | Severity of the event |
| Scope (local, ssl-web) | Authentication scope |
| Action (login, logout) | Action |
| srcport | Source port of the session |
| dstport | Destination port |
| srcip | Source IP |
| Status (success, failed) | Whether the AAA succeeded or failed |
| profile | User profile |
| duration | Duration |
| reason | Reason for failure |
| user | User |
| group | Group |
| tunnelid | Identification of the tunnel |

TABLE 6

VPN log mapping

| Field Name | Field Description |
|---|---|
| @timestamp | Timestamp of the event |
| @id | Identification of the event |
| logid | Log identification number |
| Level | Severity of the event |
| Type (vpn) | Type of the event (value: traffic) |
| Subtype (ssl, ipsec) | Subtype of the event |
| devid | Unique identification number of the system |
| devname | Name of the system |
| vdev | Virtual domain of the system |
| tunnelid | Tunnel ID |
| remoteip | Remote IP |
| tunnelip | Tunnel IP |
| Status (up, down) | |
| user | User |
| group | Group |
| sentybte | Sent byte |
| rcvdbyte | Receive byte |
| duration | Duration |
| reason | Reason |
| tunneltype | Tunnel type |

TABLE 7

Access Control log mapping

| Field Name | Field Description |
|---|---|
| @timestamp | Timestamp of the event |
| devname | ID of the device |
| devid | Name of the device |
| domain | Name of the virtual device |
| logid | ID of the event |
| Type (acc. ctrl) | Type of the event |
| Subtype (app web) | Subtype of the event |
| level | Severity of the event |
| srcport | Source port of the session |
| srcip | Source IP of the session |
| Srcintf | Source interface of the session |
| Dstintf | Destination interface of the session |
| Dstip | Destination IP of the session |
| Dstport | Destination port of the session |
| Service | Service of the session |
| Sessionid | ID of the session |
| Policyid | ID of the security policy |
| Identidx | ID of the identification policy |
| User | Identified user of the session |
| Group | Identified user's group of the session |
| profile | Security profile that catches the application |
| proto | Protocol number in IPv4 packets |
| Status (pass, block, reset, reject, passthrough, monitor) | Status of the action taken |
| app | Application name |
| appid | Application ID |
| count | Number of packets |
| hostname | Hostname of the destination |
| url | URL of the destination |
| Reqtype (direct, referral) | HTTP request type |
| method | Method use |
| sentbyte | Sent bytes |
| rcvdbyte | Received bytes |
| cat | Category of the application0 |
| catdesc | Description of the category |

TABLE 8

Accumulated Standard fields mapping

| Category | Field Description |
|---|---|
| Standard fields (always present) | @timestamp<br>@id<br>@srcevent<br>Devid<br>Logid<br>Type<br>Subtype<br>Level |

The network security monitor 120 may include an aggregator 220 designed and constructed to obtain, receive, retrieve threat intelligence from one or more repositories. The aggregator 220 can access one or more threat repositories via the external network 104, such as the security intelligence repositories 202a-n, using protocols such as HTTP, FTP, P2P, etc. To access or establish a connection with a repository 202a-n, the aggregator 220 may obtain configuration details from the database 240 including, e.g., URL of a repository 202a-n, information transfer protocol, and/or authentication credentials specified by repository vendors. Using the connection, the aggregator 220 may periodically ping, receive, or otherwise obtain current or up-to-date information from the security intelligence database or resource 202a-n. This information may be provided by a security community or crowd sourced, and accessed via an external network 104. The information may be time stamped or otherwise flagged so the network security monitor 120 can determine if the information is new. In some embodiments, the network security monitor 120 may receive a real-time data feed of security information. The crowd sourced information may be in multiple forms such as Vulnerabilities, Exploits, signatures, MD5s, IP Reputation, Domains Reputation, Traffic Patterns etc. from public and private repositories such as CERTs, TOR forums, social networking feeds, Security Vendors, Academia, Private Security Researchers, Metasploit, ExploitDB etc.

A vulnerability may refer to a weakness in software, hardware, or firmware of the protected network 204 or system or component thereof. Such weakness might allow an adversary to violate the confidentiality, the availability, and the integrity of the system, its processes/applications, as well as, the data the system generate and manage. In network security, vulnerability may refer to the weakness of a network device/station that could allow unauthorized intrusion in the network. Further, human weaknesses regarding the information security sensitivity are considered as vulnerabilities that can be exploited by social engineering techniques. In security industry, there are a plethora of vulnerability schemes and registries specified, generated, and maintained by various enterprises, organizations or research institutions. Such registries for instance are the CERT Advisories maintained by the Software Engineering Institute at Carnegie Mellon University of Pittsburgh, Pa., the CVE scheme maintained by MITRE Corporation of Bedford, Mass., the Bugtraq vulnerability list maintained by Security Focus of SYMANTEC CORPORATION of Mountain View, Calif. Various entities, corporations, or software firms may also maintain public vulnerabilities registries regarding the products they develop in relevant web sites. In various embodiments, the network security monitor 120 can be configured to receive, access, look up, process, analyze or otherwise obtain and utilize information of one or more vulnerabilities lists or registries in one or more formats, standards, or schemes. For example, the network security monitor 120, via the aggregator 220, can be configured to use the CVE vulnerability scheme created by MITRE Corporation. However, in some embodiments, the tool can be vulnerability scheme independent.

In some embodiments, an exploit refers to a piece of software, a chunk of data, or a sequence of commands that takes advantage of a bug or vulnerability in order to cause computer software and/or hardware to have unintended or unanticipated behavior. Such behavior may aim to gain control of a system, allowing privilege escalation, or a denial-of-service attack. Signatures can refer to attack patterns that are used by the tool. The signatures, or patterns, specify attacks in a network, a network node, a networked device, at a host level.

The aggregator 220 can access the security intelligence repositories or resource 202a-n to update the threat indicator lists stored in the database 240. The aggregator 220 may crowd source threat information via an external network 104 (e.g., the Internet) to update the threat indicator list using private and/or open source threat intelligence repositories including but not limited to IP addresses, malware and malicious code samples, and IPS signatures. The network security monitor can aggregate and store the threat intelligence in a database infrastructure 240 (e.g., file server, file system) using a threat intelligence schema/format for organizing and making the aggregated threat intelligence manageable and maintainable.

In some embodiments, the aggregator 220 can access multiple disparate, heterogeneous security intelligence repositories 202a-n to retrieve threat intelligence. These repositories may be referred to heterogeneous because they provide different types of threat intelligence (e.g., IP address, malware code, malicious code, IPS signatures) in different formats, or an unstructured. To access the security intelligence repositories 202a-n, the aggregator 220 may access configuration details or a profile in database 240 that provided access credentials such as a username, password, token, etc. to allow the aggregator to obtain threat intelligence. The profile stored in database 240 may include configuration details or credentials for some or all of the repositories 202a-n. In some embodiments, the aggregator 220 may maintain an open connection with one or more repositories 202a-n in order to continuously obtain up-to-date threat intelligence information, while in other embodiments the aggregator 220 may periodically ping one or more repositories 202a-n, or receive a push notification or other indication of new threat intelligence.

The network security monitor 120 may include a normalizer 235 designed and constructed to organize, normalize, process, transform, or otherwise analyze the threat intelligence obtained by the aggregator 220 (or stored in database 240) to generate a list of threat indicators. In some embodiments, normalizing the threat intelligence data may include de-duplicating redundant data and/or transforming the threat intelligence data into a structured list of threat indicators corresponding to a threat scheme (or log format schema). The network security monitor 120 can generate the list of threat indicators based on a schema for threats (e.g., threat schema or threat intelligence schema). The schema used by the network security monitor 120 (e.g., normalizer 235) organizes the aggregated threat intelligence and makes the threat intelligence database manageable and maintainable. The threat intelligence schema/format can be applied to threat indicators aggregated from different private and open source threat intelligence repositories including, (e.g., Internet Protocol address, a malware code sample, a malicious code sample, or an intrusion prevention system signature) to be structured and expressed as a list of threat indicators to allow the log correlation engine 225 to identify a threat.

The network security monitor 120 can use an ontology definition that models security in different types of infrastructures (such as based on public/private cloud, premise implementations). The threat intelligence schema can be based on semantics and indicators regarding internet protocol (IP) and domain blacklists, malware, and vulnerabilities signatures. For example, the threat intelligence schema may include a section for IP reputation that specifies field about the actual IP, host, IP country, types of threats from this IP, and latest activity.

In some embodiments, the threat intelligence schema can include the log format schema illustrated in tables 1-8. By normalizing or organizing the threat intelligence received from disparate, heterogeneous sources with different formats and structures, the log correlation engine 225 can efficiently identify threats in the protected networks 204. In some embodiments, the normalizer 235 can organize or normalize the threat intelligence received from the security intelligence repositories 202a-n using some or all of the same schema illustrated in tables 1-8 that is used to index the logs received by the log collector 210. By using the same or similar schema (or some or all of the schema or log format in tables 1-8), the network security monitor 120 can improve the log correlation engine 225 performance.

In some embodiments, the network security monitor 120 can update the schema stored in the database to index the logs or normalize the threat intelligence. For example, as new threat intelligence repositories become available to the aggregator, network security monitor 120 may revise the schema/format to allow the intelligence coming from each new repository to be formatted properly by the normalizer. The revisions may include the addition of new fields for new types of threat intelligence, grouping of different intelligence into the same or different fields, new naming conventions, etc.

The network security monitor 120 may include a log correlation engine 225 designed and constructed to compare the list of threat of indicators with the indexed logs to identify a threat in the protected network. The log correlation engine 225 may obtain or retrieve the list of threat indicators and the indexed logs from database 240. In some cases, the log correlation engine 225 may receive the list of threat indicators from the normalizer 235 or aggregator 220, and/or receive the indexed logs from the log indexer 215. The log correlation engine 225 can include or be configured with a heuristic algorithm that can search through the indexed logs and compare them to the one or more lists of threat indicators. In some embodiments, the log correlation engine 225 can search the indexed logs and compare them to threat indicators at the same time, simultaneously, in parallel, or close together in time. For example, the log correlation engine 225 may utilize multiple cores or processing threads to search and compare logs with list of threat indicators. In some embodiments, the log correlation engine 225 can search for a first type of log in the indexed logs (e.g., email), and then compare those indexed logs with a corresponding list of threat indicators while searching for another type of indexed log.

The log correlation engine 225 may determine a threat exists in the protected network 204 by identifying similarities or correlations between the indexed logs of the protected network and the threat indicator lists. The log correlation engine 225 can identify potential APTs based upon their behavior and the patterns they create within the system; patterns, which may be otherwise undetectable, but can be revealed by the analysis performed by the correlation engine. The log correlation engine 225 can store the results of the comparison in the database 240, or provide the results of the comparison to the report engine 230 to generate a report or an alert.

The log correlation engine 225 can use a heuristic algorithm to identify a threat. The heuristic algorithm can include or be configured with one or more correlation rules whose conditions involve both the indexed logs and the list of threat indicators. The correlation rules may be applied to some or all the indexed logs. For example, the log correlation engine 225 can apply a correlation rule to some of the indexed logs (e.g., recently indexed within a time period such as a day, week, month, etc.), or all of the indexed logs including indexed historical logs. By analyzing indexed historical logs, the log correlation engine 225 can identify APTs that may have been infecting the protected network 204 for hundreds of days or longer. In some embodiments, the log correlation engine 225 can compare logs responsive to a new log or new indexed log or responsive to new threat intelligence information or new list of threat indicators. For example, the log correlation engine 225 can perform a new comparison if the schema or format changed for the log index or the list of threat indicators, or if new logs or threat information is received.

In an illustrative example, the log correlation engine 225 can use the following correlation rule to identify a threat: At any time, for any traffic log, if log's source or destination IP address is blacklisted, then generate an alert including the involved IP addresses of the under examination log. This exemplary correlation rule includes several conditions or parameters such as a temporal parameter (any time), a log type (traffic log), a log fields (source or destination IPs), and a list of threat indicators (blacklisted IPs). The correlation rule further indicates what type of report is to be generated by the report engine 230, and what the report is to include. Thus, the network security monitor 120 can identify a match (e.g., when the conditions of the correlation rule are satisfied by an indexed log and a threat indication) and notify an administrator or user of the protected network 204 that there is network activity or a communication between the protected network 204 (e.g., an internal IP address of the protected system) and an IP address that is known to be malicious based on security intelligence.

As this example illustrates, a correlation rule can include a condition or a parameter of the indexed log that is to be compared with a threat indicator to identify a match. The correlation rule may further include temporal information. In another example, a correlation rule may include: In the last 7 days, for any email log, if the sender of the email is blacklisted and the email includes an attachment, then generate an alert including the timestamp of the email and the sender of the email. Yet another example of a correlation rule may be: In the last 72 hours, for any performance log, if the percentage of CPU usage is greater than 90% and/or the percentage of memory usage is greater than 90%, then generate an alert with the type of the event and the device identifier.

In some embodiments, both normalized threat intelligence and log repositories are updated constantly (e.g., in response to receiving a new log or threat information). The threat intelligence or list of threat indicators are updated with new threat intelligence from the open source security repositories, while the logs or indexed logs are updated with the behavioral information (translated in logs) from the devices/collectors (e.g., monitoring agent) of the protected system. In addition to using correlation rules, the network security monitor 120 may analyze the recorded logs to maintain behavioral profiles for the protected network 204. The behavioral profile may be for a user of the protected system and include behavioral indicators and corresponding baselines of the behavior of the system. A baseline behavior of the system may indicate the behavior when there is no threat present in the protected network 204. For example, performance behavior based on performance logs or traffic behavior based on traffic logs when the network security monitor 120 determines that there is APT present in the protected network.

Using this baseline behavior profile stored in the database 240, the network security monitor 120 may be able to predict threats. By analyzing logs and comparing them to baseline behavior may allow the network security monitor 120 to provide early notification about unknown and/or advanced persistence threats. In some embodiments, the network security monitor 120 obtains a baseline behavior profile for the protected system or specific server or client thereof, and compares the baseline behavior profile with a current indexed log (for the corresponding client or server, or a similar type of component). If the current behavior differs from the baseline behavior (e.g., a threshold amount of different performance usage, different email senders, pings, different URLs, etc.), then the network security monitor 120 may generate an alert or report. In some cases, the network security monitor 120 may initiate the aggregator 220 to actively search for and obtain new threat intelligence responsive to identifying a change in behavior from the baseline behavior.

The network security monitor 120 may include a report engine 230 designed and constructed to generate a report based on the log correlation performed by the log correlation engine 225. The report engine 230 can store the reports in the database 240, or provide the report to an administrator or user of the network security monitor 120 via a communications method such as network 204 or network 104. The report engine 230 may generate the report responsive to the log correlation engine 225 identifying a threat. In some embodiments, the report engine 230 may generate a report based on a time interval (e.g., hourly, daily, weekly, monthly), regardless of whether a threat was identified (e.g., report may indicate that no threats detected in protected network in last 24 hours).

The report engine 230 may include information associated with the protected network 204 or identified threat in the report. The report engine 230 may include type of threat, a correlation rule that triggered the threat, a timestamp, an identifier of a device or network component or network associated with the threat, and additional information that may be specified by an administrator of the network security tool 120 or in the correlation rule that initiated, triggered, or instructed the report engine 225 to generate the report.

Figure 3:
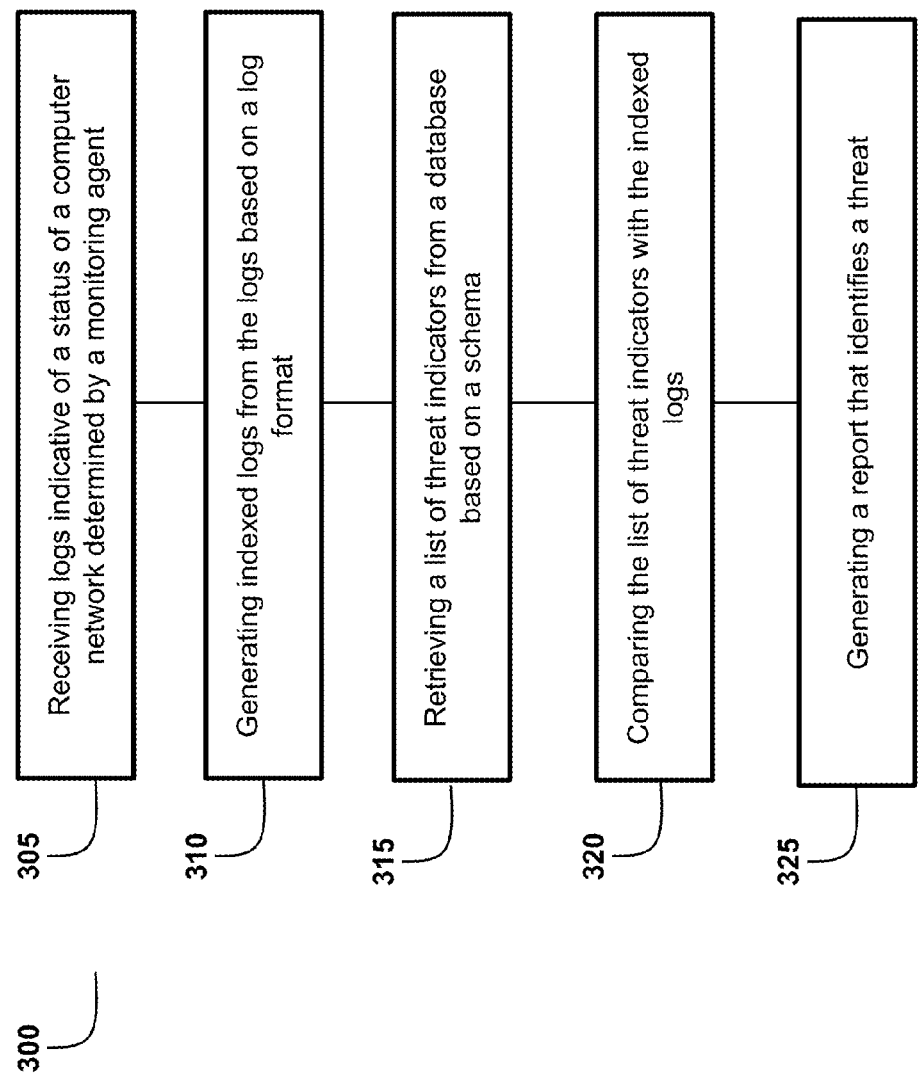
FIG. 3 is flow diagram depicting an embodiment of a method of managing security on network infrastructure.

FIG. 3 is flow diagram depicting an embodiment of a method of managing security on network infrastructure. In brief overview, at step 305 a log collector receives logs of a protected network. At step 310, a log indexer can index the logs based on a log format. At step 315, a log correlation engine can retrieve a list of threat indicators from a database. At step 320, the log correlation engine can compare the list of threat indicators with the indexed logs. At step 325, a report engine can generate a report that indicates a threat was detected.

Referring to FIG. 3, and in further detail, at step 305 a log collector receives logs of a protected network. The logs may be generated by a monitoring agent executing, running, or monitoring one or more aspect of the protected network. The monitoring agent may reside on a server or client device of the protected network. The monitoring agent may monitor performance of hardware resources (e.g., CPU, memory, input/output, hardrive accesses, etc.). The monitoring agent may monitor an email server or file server of the protected network. The monitoring agent may generate logs based on traffic in the protected network (e.g., source/destination IP addresses or ports, URLs, etc.). The monitoring agent can include various tools such as antivirus tools or other tools that monitor aspects of a protected network and generate logs that can facilitate identifying a threat in a protected network. The logs may be provided to the log indexer (or network security monitor) in real-time (e.g., as logs are generated), or based on a time interval (e.g., hourly, daily, weekly, etc.). In some embodiments, the log indexer may request a log, and the log indexer may receive one or more logs from the monitoring agent response to the request.

At step 310, a log indexer can index the logs based on a log format. The log format may include a schema or format illustrated in tables in 1-8. To index the logs, the log indexer can determine a type of log (e.g., email log, threat log from an antivirus tool, AAA log, etc.). The log indexer may then retrieve, from a database, the corresponding schema for that log. The log indexer may then identify, from the log, the information corresponding to each field and label or tag the information with the field information. The log indexer may then store this information in a structured manner in a data structure or database. Thus, by indexing the logs using the log format, and storing it in a data structure configured with the log format, the log indexer can improve the efficiency of the log correlation engine.

At step 315, a log correlation engine can retrieve a list of threat indicators from a database. The list of threat indicators may be stored in the database in a manner that facilitates them being compared to the indexed logs. The threat indicators can be organized based on categories, such as IP address related threats, malicious code samples, or threat signatures. The log correlation engine can compare the one or more lists of threat indicators. For example, each list of threat indicators may correspond to a different category. The log correlation may only retrieve the category that corresponds to the indexed log for which a comparison is to be performed. For example, if the log indexer receives threat logs at this time, then the log correlation engine may retrieve a list of threat indicators corresponding to threat logs (e.g., IP addresses), and perform the comparison.

The log correlation engine may include correlation rules with conditions. The log correlation engine can determine a match between an indexed log and a list of threat indicators using the rule. For example, a rule may indicate a threat if greater than 5 pings are received from a blacklisted IP address within a short duration.

In some embodiments, an aggregator can receive threat indicators from heterogeneous sources via an external network (e.g., Intranet). These sources may include threat intelligence repositories or security intelligence repositories. The threat intelligence maybe crowd sourced from various feeds including, e.g., social network feeds, blogs, news articles, websites on which security companies publish latest threat information, etc. Heterogeneous sources may include these different types of sources. The normalizer can use a schema or organization rule to remove duplicate threat information, and categorize the threats into lists of threat indicators (e.g., IP Addresses, malware and malicious codes, IPS signatures) that include structured information for use by the correlation engine.

In some embodiments, the aggregator may access a database with configuration details that grant the aggregator access to a security intelligence repository. Configuration details may include a URL or IP address of the security intelligence repository, username, password, etc. In some embodiments, the aggregator may obtain multiple configuration details or log-in credentials in order to access multiple threat intelligence repositories. For example, the aggregator may use a first configuration to establish a connection with a first repository, and a second configuration to establish a connection with a second repository. The aggregator may then update the list of threat indicators based on one or more received threat indicators from the repositories.

At step 320, the log correlation engine can compare the list of threat indicators with the indexed logs. The log correlation engine may use a correlation rule to compare the threat indicator with the indexed logs. The correlation rule may include conditions such as temporal conditions or other conditions based on fields in the schema for logs as illustrated in tables 1-8. The correlation rules may include Boolean logic operators (e.g., AND, OR, NOT) or correlation conditional logic (e.g., If "x", then "y"). The correlation engine can search for correlations between logs and threat indicators, and identify a match based on the correlation (e.g., a match may refer to satisfying the condition of the correlations, or a semantic or literal match between fields of the log index and the threat indicator; a substantial match based on a percentage of matching such as 90% match or 80% match or 95% match, etc.).

The log correlation engine may perform the comparison on a subset of logs. For example, if new threat information of a certain category of threats is received, the log correlation engine may retrieve a subset of indexed logs from the database corresponding to the category of the updated threat information, and perform a correlation on the retrieved subset of logs. This may improve the efficiency of the log correlation engine and allow the log correlation engine to more quickly account for new threat information when monitoring the protected network. Similarly, when the log correlation receives a new log file, the log correlation engine can index the log, identify a type of log (e.g., email log), and then compare the newly indexed log with a corresponding subset of threat indicators that corresponds to the log type.

In some embodiments, the log correlation engine may perform the comparison responsive to receiving new logs from the protected network. The log correlation engine may perform the comparison responsive to receiving new threat information from the aggregator or a security intelligence repository.

At step 325, a report engine can generate a report that indicates a threat was detected. The repot engine can generate the report responsive to the log correlation engine completing a run. The report engine may generate a report regardless of whether a threat was detected. For example, the report may indicate that the network is clean. For example, the report engine can generate a report based on the comparing to identify a threat, where the report indicates that the network was either clean (e.g., no threat identified as a result of the comparing), or the network is infected (e.g., a threat was identified as a result of the comparing).

The report engine can communicate this report via a network in various forms using various communication techniques including, e.g., text messages, SMS messages, instant messaging, emails, notifications, prompts, visual alerts, lights, alarm sounds, etc.

Figure 4:
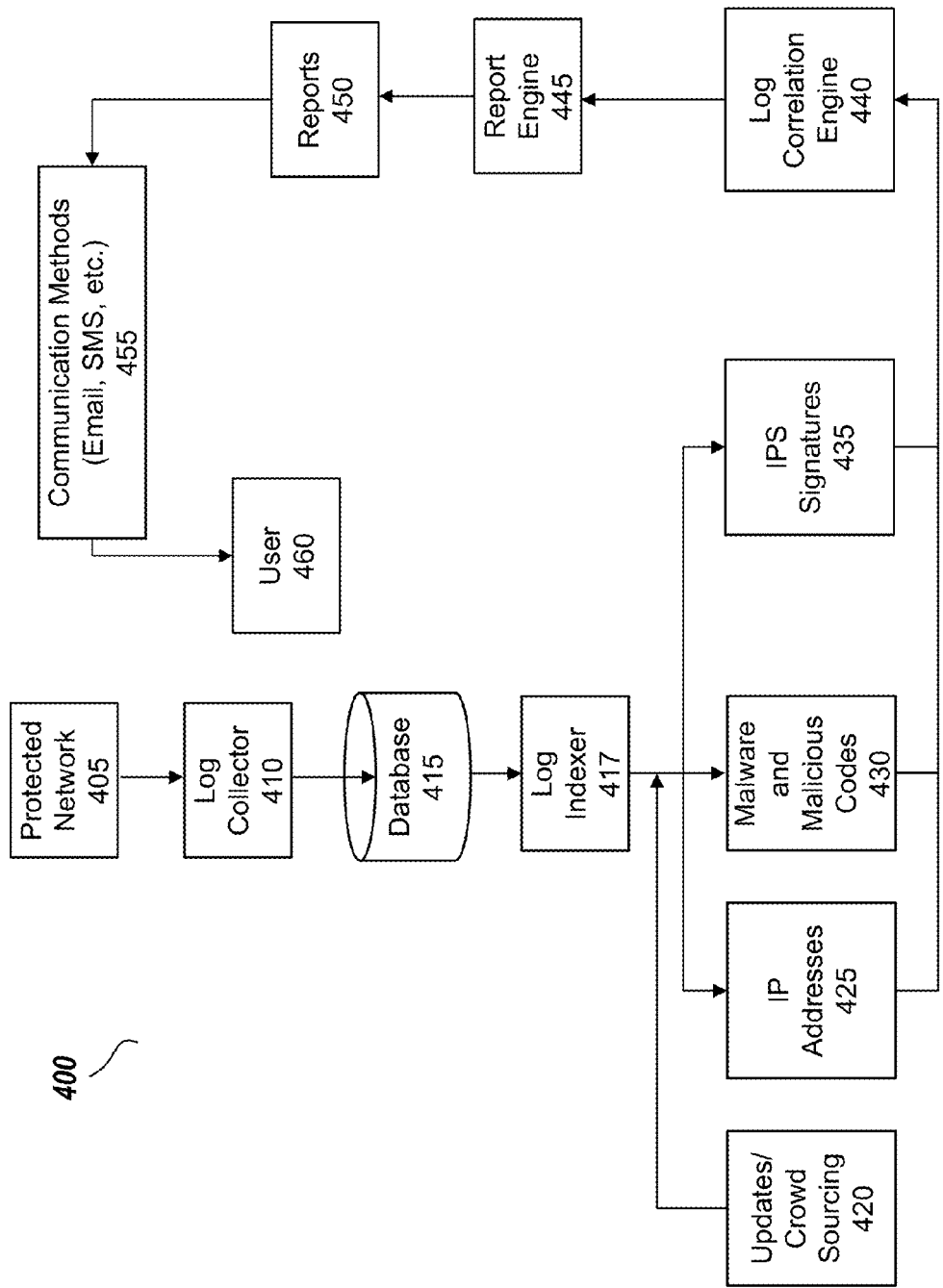
FIGS. 4-5 are a flow diagram depicting an embodiment of a system for managing security on a protected network.

FIG. 4 is a flow diagram depicting an embodiment of a system for managing security on a protected network. The system 400 includes a protected network 405 (e.g., having similar function and design as protected network 204). The system 400 includes a log collector 410 (e.g., having similar components and configured to perform functions performed by log collector 210) that receives logs from the protected network 405. The system 400 includes a database 415 (e.g., having similar components and configuration as database 240) that stores the logs received from log collector 410. The system 400 includes a log indexer 417 (e.g., having similar components and configured to perform functions performed by log indexer 215) that indexes the logs stored in the database 415. The system 400 includes modules or interfaces configured obtain different types of threat intelligence, such as an update/crowd sourcing module 420, an IP addresses module 425, a malware and malicious codes module 430, and an IPS signatures module 435. In some embodiments, a single module or interface can access these different types of threat intelligence, such as an aggregator. The system 400 includes a log correlation engine (e.g., having similar components and configured to perform functions performed by log correlation engine 225) that compares the indexed logs with threat intelligence to identify a threat. The system 400 includes a report engine 445 (e.g., having similar components and configured to perform functions performed by report engine 230) to generate a report responsive to the log correlation identifying a threat (or determining the protected network does not have an existing APT). The system 400 can store the reports 450 and provide the reports via one or more communications methods 455 to a user device 460.

Figure 5:
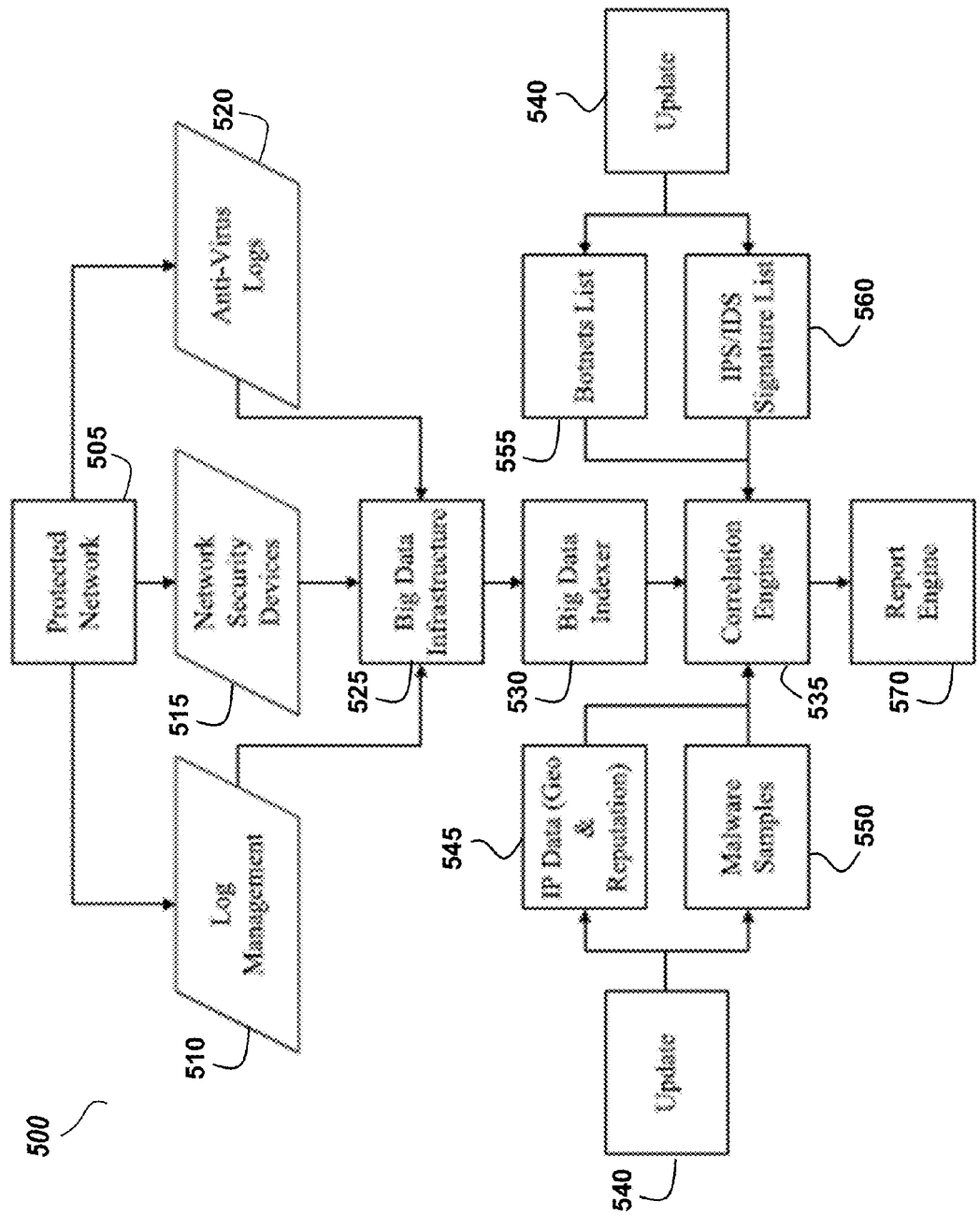

FIG. 5 is another flow diagram depicting an embodiment of a system for managing security on a protected network. The system 500 includes a protected network 505 (e.g., protected network 204). Network security devices 515 can interface with protected network 505. The network security device 515 may include one or more component of the network security monitor 120. The network security device 515 may communicate or interact with a big data infrastructure 525 that receives logs from a log management module 510 and anti-virus log module 520. The big data infrastructure 525 may include one or more component of the network security monitor 120, such as a log collector 525. In some embodiments, the log collector 525 may include functionality or components of big data infrastructure. Big data infrastructure 525 may refer to tools for storing, processing and analyzing data. The big data infrastructure 525 may allow for parallel processing, massively parallel processing, cloud computing (software as a service), various database technologies referred to as NoSQL (Not Only SQL). An illustrative example of big data infrastructure may include HADOOP by APACHE.ORG, which is an open source framework for processing, storing and analyzing data using an open source framework. This framework may include different components such as a storage layer (e.g., HDFS), MapReduce (e.g., a tool that can execute a wide range of analytic functions by analyzing datasets in parallel before "reducing" the results), YARN by APACHE.ORG (e.g., to cluster management and scheduling of user applications), and SPARK by APACHE.org (e.g., to allow data to be loaded in-memory and queried repeatedly).

The big data indexer 525 can index the logs received from the protected network 505. Big data indexer 525 can include components or functionality of a log indexer and the big data infrastructure 525 to facilitate indexing the logs.

The system 500 can include a correlation engine 535 that compares threat intelligence information with log received from the protected network 505. The correlation engine 535 can include one or more components of the correlation engine 225. Threat information can include IP data that indicates geography or reputation 545, malware samples 550, botnets lists 555, and/or IPS/IDS signature lists 560. The system 500 can include update modules 540 that update the information stored in databases, data structures, repositories or modules 545, 550, 555, and 560. The information stored in the repositories 545, 550, 555, and 560 may include threat information received from various third-party security intelligence repositories. In some instances, the information stored in repositories 545, 550, 555 and 560 may include organized or normalized threat information. The threat information may be normalized by removing duplicate threat indicators, or otherwise organizing the threat information based on threat types.

The system 500 may include a report engine 570, responsive to the correlation engine 535, can generate an alert or a report with the findings of the correlation engine 535. The report engine 570 may include one or more component or functionality of report engine 230.

Figure 6:
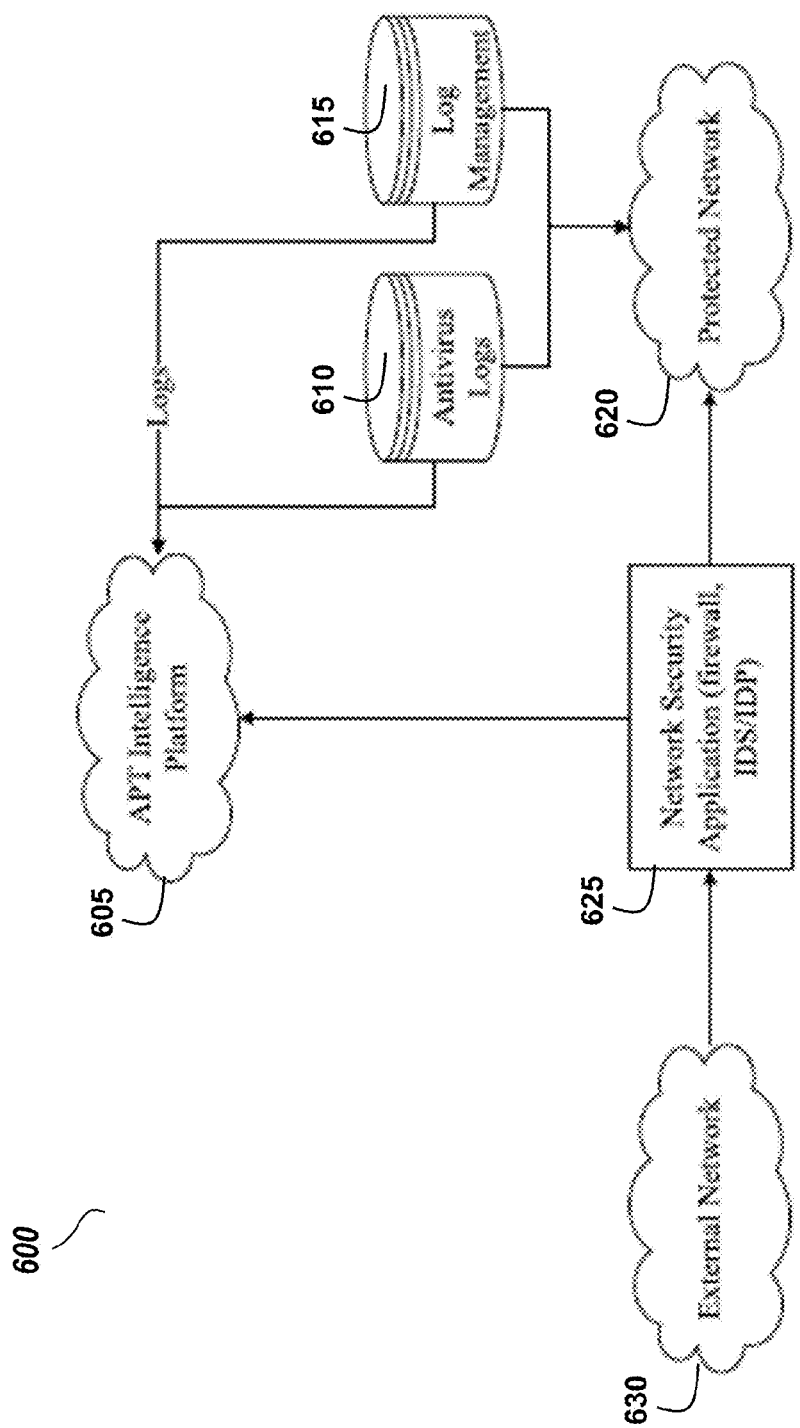
FIG. 6 is a flow diagram depicting an embodiment of a distribution of system components in relation to an external network and a protected network.

FIG. 6 is a flow diagram depicting an embodiment of a distribution of system components in relation to an external network and a protected network. The system 600 includes an APT intelligence platform 605. This APT intelligence platform 605 may include one or more components or functionality of the network security monitor 120. The system 600 includes a repository having antivirus logs 610 (e.g., threat logs) obtained from the protected network 620 via an antivirus software or tool. The system includes a second repository (or could be combined into one repository) having log management 615 logs such as systems logs of the protected network, traffic logs, email logs, or other types of logs. The system 600 may include a network security application 625. The network security application 625 may include a firewall or IDS/IDP system that detects threats and prevents threats. The system 600 can use an external network 630 to gather threat intelligence information, or communicate with users.

As shown in system 600, the APT intelligence platform 605 (or network security monitor) is separated from the external network 630 by a firewall 625. This firewall 625 may also protect the protected network 625. Thus, the APT intelligence platform and protected network 620 may be on the same side of the firewall 625. The APT intelligence platform 605 may access the protected network 620 to obtain logs, or the APT intelligence platform 605 may access repositories 610 and 615 storing logs obtained from the protected network 620.

Figure 7:
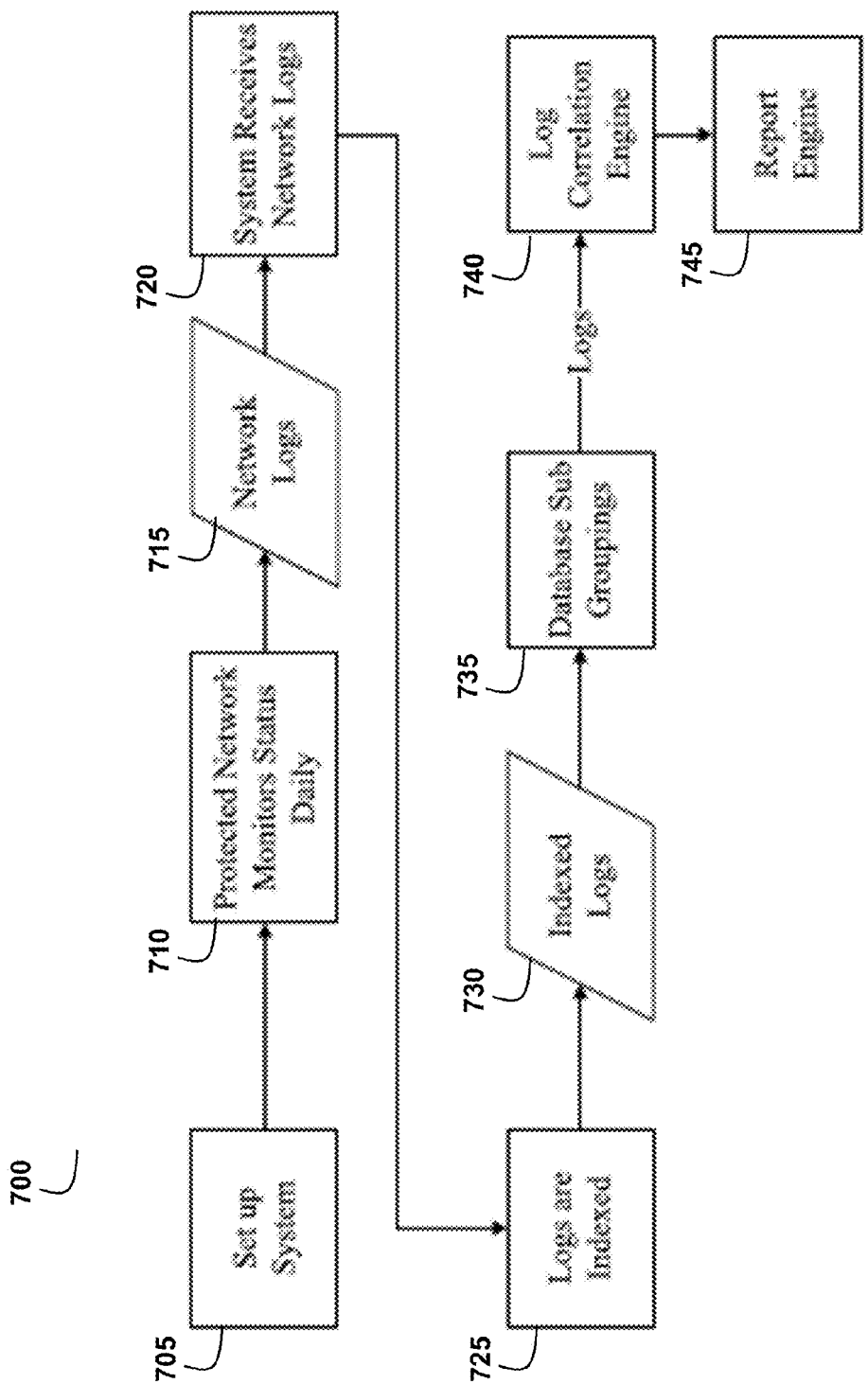
FIG. 7 a flowchart depicting another embodiment of a method managing a protected network.

FIG. 7 a flowchart depicting another embodiment of a method 700 for managing a protected network. In brief overview, the method 700 includes setting up a network security monitor for managing the network at step 705. At step 710, the network security monitor monitors the daily status of the protected network. At step 715, the protected network generates network logs, which the monitor receives at step 720. At step 725, the monitor indexes the logs and creates indexed logs at step 730. At step 735, the monitor stores the indexed logs in a database under the appropriate sub groupings (e.g., organized based on email logs, threat logs, traffic logs, performance logs, AAA logs, etc.). At step 740, a correlation engine of the monitor can receive the logs and compare the logs with threat information. At step 745, a report engine of the threat monitor generates a report.

In further detail, at step 705 the monitor is set up to receive system logs from the protected network. These system logs are sent to the monitor via the internet and are received by the log collector. In some embodiments, the monitor is a third party system that is not directly installed into the protected network which it is protecting. Since it is not directly installed on the protected network, the monitor receives the logs from the protected network.

At step 710, the protected network monitors its daily status through one or more tools including, but not limited to, antivirus programs, system status logs, and network security systems such as IPSs. This information is compiled into a package of data which can be later sent to the monitor (e.g., APT intelligence platform) for analyzing, at step 715. These logs are used to determine whether or not the protected network is currently infected with an APT. At step 715, the monitor receives the system logs from the protected network. The system logs are received by the log collector. The monitor can receive the system logs from the protected network.

At step 725, the logs are indexed and organized by the log indexer. Indexing the logs provides advantages in that the logs can be compared to only specific sections of the threat indicator list which helps to improve the efficiency of the present invention. At step 735 the indexed log files 730 are stored on the database for later use.

At step 740, the log correlation engine compares the logs to the threat indicator lists. The threat indicator list may be broken into three or more categories including but not limited to IP addresses, malware and malicious code samples, and IPS signatures. The monitor may compare the system logs and the threat indicator lists to determine if there are any similarities between the systems logs and the threat indicator lists. The log correlation engine may use a correlation rule or heuristic algorithm to identify similarities or a match. If similarities or correlations are present, then may be indicative of an APT within the protected network.

At step 745, the report engine generates a report based upon similarities or matches between the system logs and the threat indicator lists as discovered by the log correlation engine. These similarities are indicative of a potential APT being present within the protected network, and the report engine generates a report to notify the network operators of this finding. The report may also include information on how the APT was detected, thereby helping the network operators to eliminate the threat and repair any damage it may have caused. The system may generate a report even if no similarities are discovered. The method 700 may repeat by returning to step 710, continuing to monitor the protected network on a continuous basis or based on some other time interval (e.g., hourly, daily, weekly, etc.).

Increasing the frequency of system log creation and the frequency with which the system logs are sent to the APT intelligence platform (or network security monitor) can increase the resolution of the network security monitor, as it may be possible to perform more analysis in a time interval.

Figure 8:
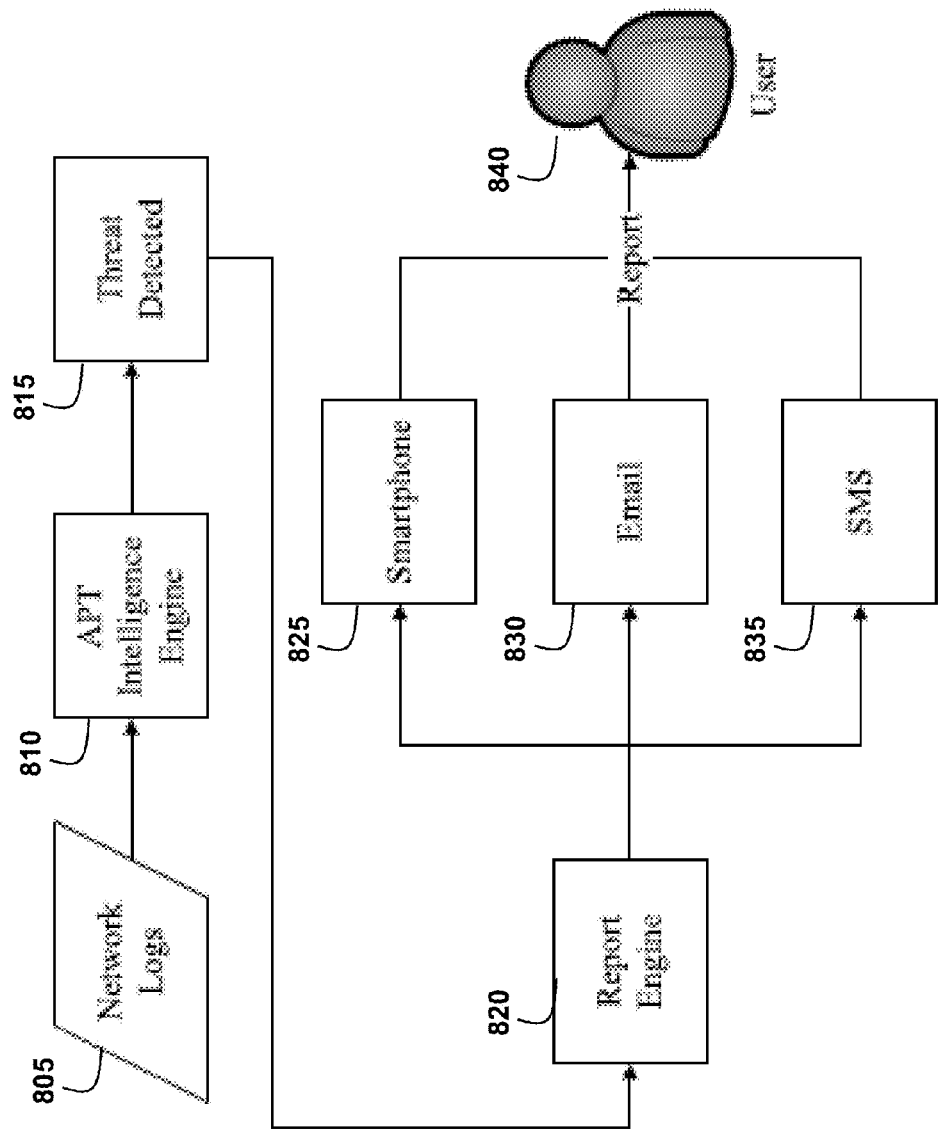
FIG. 8 is a flowchart depicting an embodiment of a system to distribute an alert report to a user.

FIG. 8 is a flowchart depicting an embodiment of distributing an alert report to a user. At block 805, network logs are created. At block 810, the APT intelligence Engine (or network security monitor) receives the network logs and indexes the logs. At 815, the intelligence engine can detect a threat, and forward an indication to the report engine 820 about the detected threat. The indication can include information about the type of threat that was detected, how it was detected, where it was detected, etc. The report engine can generate a report at block 820, and forward the report to a smartphone 825, email 830, or SMS 835, which are all provided to a user 840 via a user interface such as a display or audio. The smartphone 825 may include a mobile application configured to receive reports from the intelligence engine, and display or otherwise provide the report to a user. The report may include text, visual icons, colors indicating threat levels (e.g., red—severe threat, orange—moderate threat, green—no threat), or scores (e.g., 1 to 10 indicating threat levels, with either 1 or 10 being high threat), or semantic text (e.g., no threats, APT found, etc.).

FIG. 9 is a flow chart depicting an embodiment of a system that updates a database through crowd sourcing and official updates. The system 900 includes a crowd sourcing repository or resource 905 that includes threat information. The crowd sourcing resource 905 may refer to third party entities that observe or catalog threats. In some embodiments, the crowd sourcing resource 905 can provide security information related to vulnerabilities, exploits and IDS/IPS signatures from a large number of sources (Web, mailing lists, hacking websites, security systems, vulnerability scanning reports, specific tools like SNORT of CISCO Corporation of San Jose, Calif.). This crowd sourcing resource 900 can communicate via the internet 910 to provide the threat information to a database 915 that can store the crowd sourced information. The database 915 can interact with an updates module 915. The updates module may access the database 915 to identify updates to threat information from the crowd sourcing resource 905. The updates module 920 may initiate or trigger an aggregator to obtain threat information from one or more crowd sourced resources.

The threat information received from the crowd sourcing repositories 905 may be organized into three threat categories: IP addresses 925, malware and malicious codes 930, and IPS signatures 935. IPS signatures may refer to misuse-based or signature based behaviors. For example, a set of misuse patterns, or signatures can be generated by focusing on a limited amount of information that was sufficient to distinguish an attack from a legitimate use of the network or system in the past.

Figure 10:
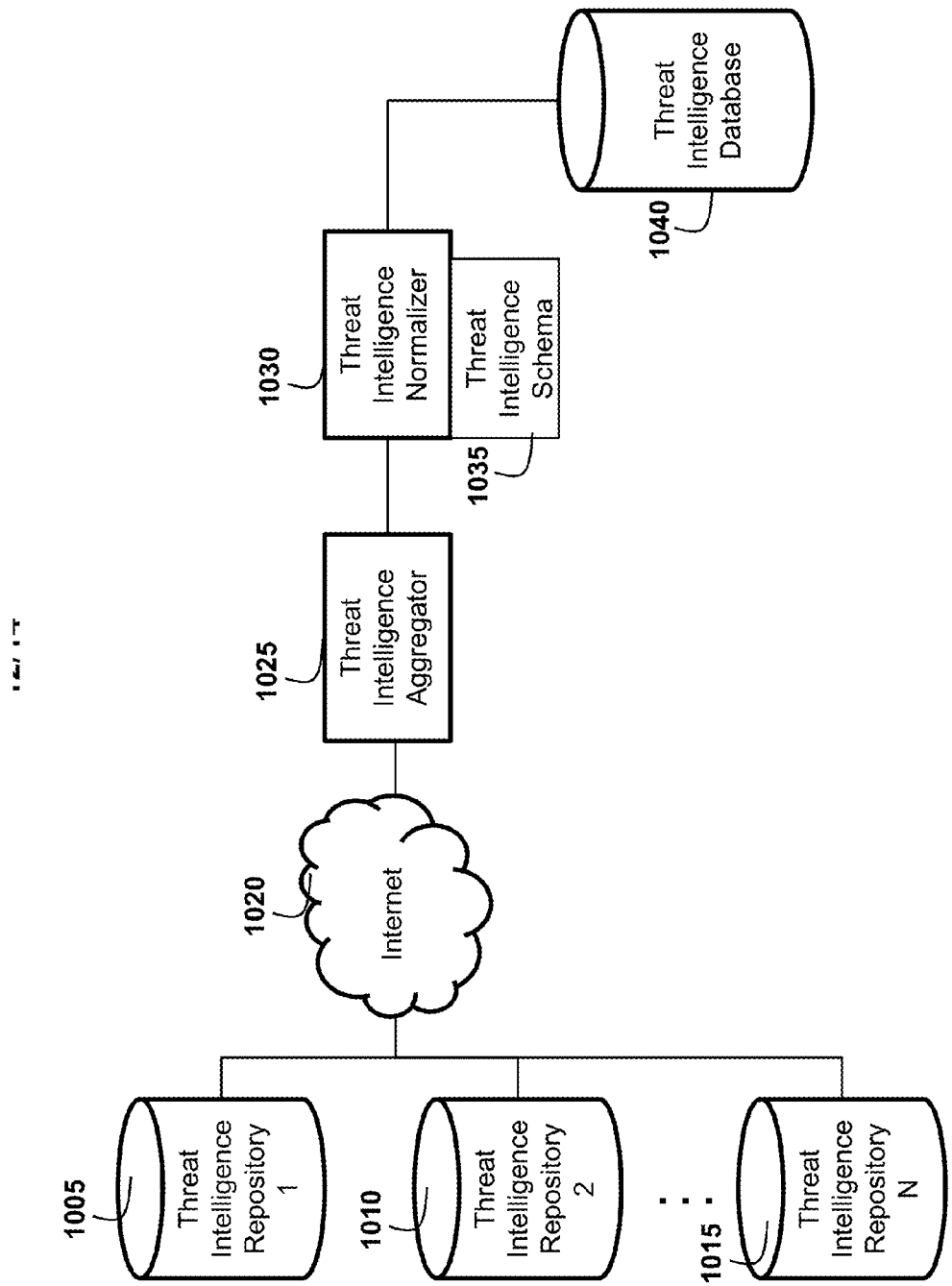
FIG. 10 is a diagram illustrating an embodiment of a threat intelligence database architecture that includes components for updating and maintaining the database.

FIG. 10 is a diagram illustrating an embodiment of a threat intelligence database architecture that includes components for updating and maintaining the database. The threat intelligence aggregator 1005 can obtain, via the Internet 1020, threat intelligence from one or more threat intelligence repositories 1005, 1010 or 1015. The threat intelligence aggregator 1025 can then forward, provide or otherwise convey the threat intelligence to a threat intelligence normalizer 1030, which may remove duplicate threat intelligence entries. The threat intelligence normalizer may further use a threat intelligence schema 1035 to organize the threat intelligence. The schema may be used to categories the threat intelligence into three lists of threat indicators such as IP Addresses, malware and malicious codes, IPS signatures. The threat intelligence schema may further include information in the form illustrated in tables 1-8. The threat intelligence, once normalized and organized using the threat schema, can be stored in a threat intelligence database 1040. This network security monitor (e.g., log correlation engine) may obtain the threat information from database 1040 to perform a comparison with the logs and identify threats.

Figure 11:
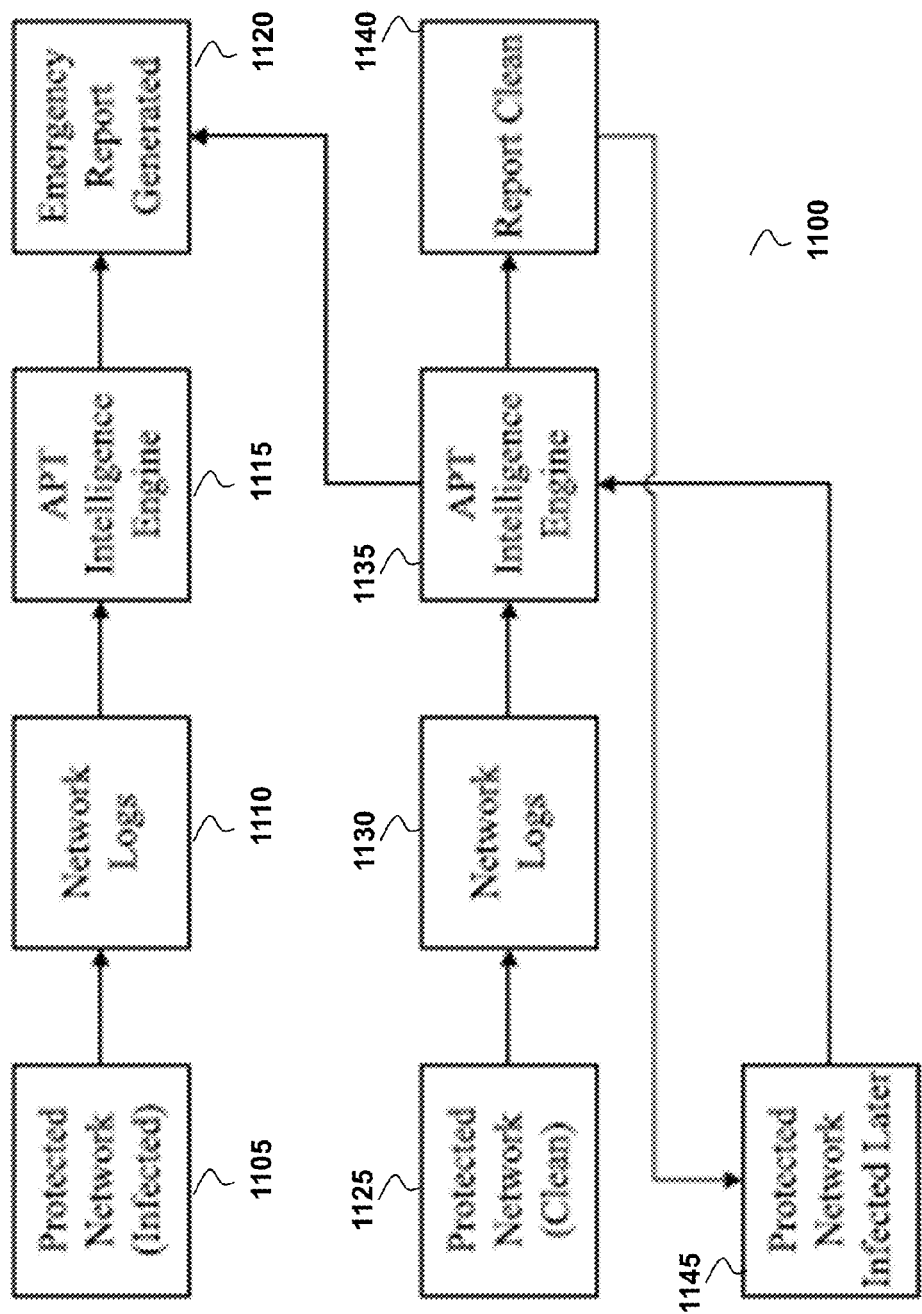
FIG. 11 is a flow chart depicting an embodiment of a method of detecting infections that have been present in a protected network prior to integration of a network security monitor, and detecting new infections occurring after installation of the network security monitor.

FIG. 11 is a flow chart depicting an embodiment of a method 1100 of detecting infections in a protected network prior to integration of a network security monitor, and detecting new infections occurring after installation of the network security monitor. At step 1105, the protected network may become infected, which may be before the APT intelligence engine is set up to detect threats in the protected network. At step 1110, a monitoring agent on the protected network can generate logs. At step 1115, an APT intelligence engine (e.g., a network security monitor) can receive the logs generated at step 1110. Since the APT intelligence was setup to monitor the protected network for the first time, this may be the first time these logs are being analyzed in this manner. The APT intelligence can index the logs, obtain threat intelligence information, normalize the threat intelligence into lists of threat indicators, and then correlate the logs with the list of threat indicators to determine that the protected network is infected based on a similarity or match. At step 1120, the APT intelligence Engine can generate (e.g., via a report engine) and emergency report indicating that there is a threat in the protected network. The report can include the type of threat, timestamp threat was detected, source of threat, device threat was found on, the identity of the network log matching the threat indicator, or other information associated with the threat that can be determined by parsing the network log.

Block 1125 represents another scenario where the network is clean. The APT intelligence engine receives the network logs at step 1135 that were generated at step 1130. Since the network is clean, the APT intelligence engine may generate a report indicating no threats at 1140. However, at a later point in time, the network may become infected at step 1145. Since the APT intelligence engine can continuously monitor the protected network (e.g., as frequently as the APT intelligence receives network logs), the APT intelligence engine can determine that there is a threat, and generate an emergency report indicated there is a threat, at step 1120.

Thus, the systems and methods of the present disclosure detect APTs within a protected network. In some embodiments, a system can aggregate threats intelligence in multiple forms such as Vulnerabilities, Exploits, MD5s, IP Reputation, Domains Reputation, Traffic Patterns etc. from public and private repositories such as CERTs, TOR forums, social networking feeds, Security Vendors, Academia, Private Security Researchers, Metasploit, ExploitDB etc. The system can normalize the feeds from public and private repositories in a unified format and, via an automated process, delete duplications. The system can store the feeds from these private and public repositories based on their reputation which is adjusted by the accuracy and quality of their data. If the accuracy/quality drops below a certain level an alert is generated for the administrator to manually validate the content of the feed. For example, a feed may be deemed to be inaccurate if multiple other threat sources indicate that a threat identified in the feed is not really a threat, or a false positive. Poor quality may refer to lack of useful data to actually identify a threat (e.g., missing fields in data so it cannot be properly indexed or normalized). The system can edit and update the feeds lists based on manual adding and removing sources in the form of RSS (an XML-based standard for rich site summary), TOR Forums crawlers (e.g., an anonymous method of conducting online activity by separating identification and routing by encrypting and then randomly bounding communications through a network of relays run by volunteers around the globe), emailing lists, APIs, social network feeds crawlers, etc. The system of claim can continuously update, check, crawl etc. available private and public threat repositories so the system is constantly up to date. The system can further normalize the threat information each time the system receives new threat information.

The system can collect, store and index logs from various systems of the protected network such as log repositories, SIEMs, network security elements etc. The system can also normalize these logs in a unified format as to be easier to correlate them. The system can correlate current and past logs and log sets in real-time continuously, as to identify threats of a type that are now penetrating the protected network or had passed unnoticed in the past. The system can generate alerts in various formats such as SMS, email, visual signs via its GUI etc. for matches found along with the associated logs, internal IPs, external IPs, type of incident, triggered repository etc. In some embodiments, the system may be accessible by $3^{rd}$ parties via an API as to enable network and information security elements, systems, platforms etc. to utilize its threat intelligence for their own systems' accuracy optimization. In some embodiments, the system may be cloud based and the normalized repositories both threat intelligence and logs can be elastic.

While the invention has been particularly shown and described with reference to specific embodiments, it should be understood by those skilled in the art that various changes in form and detail may be made therein without departing from the spirit and scope of the invention described in this disclosure.

What is claimed is:

1. A method of managing security on network infrastructure, comprising:
receiving, by a log collector configured on a processor of a network security monitor via a first computer network, a plurality of logs of a second computer network, the plurality of logs indicative of a status of the second computer network determined by a monitoring agent executing on the second computer network;
generating, by a log indexer configured on the network security monitor, indexed logs from the plurality of logs based on log format;
retrieving, by the network security monitor, a list of threat indicators from a database based on a schema from a plurality of threat indicators received from a plurality of heterogeneous repositories via the first computer network, the plurality of threat indicators including at least one of an internet protocol (IP) address, a malware code sample, a malicious code sample, or an intrusion prevention system (IPS) signature;
comparing, by a log correlation engine configured on the network security monitor, the list of threat indicators with the indexed logs; and
generating, by a report engine configured on the network security monitor, a report based on the comparing to identify a threat.

2. The method of claim 1, further comprising:
receiving, by an aggregator of the network security monitor, one or more threat indicators from a plurality of heterogeneous sources via the first computer network; and
using, by a normalizer of the network security monitor, the schema to transform the one or more threat indicators to the list of threat indicators, the list of threat indicators comprising structured information configured for use by the log correlation engine.

3. The method of claim 1, further comprising:
obtaining, by an aggregator of the network security monitor, a first configuration for accessing a first repository via the first computer network;
obtaining, by the aggregator, a second configuration for accessing a second repository via the first computer network;
using, by the aggregator, the first configuration to establish a first connection with the first repository via the first computer network;
using, by the aggregator, the second configuration to establish a second connection with the second repository via the first computer network; and
updating, by the network security monitor, based on the schema, the list of threat indicators based on a threat indicator received from at least one of the first repository or the second repository.

4. The method of claim 1, further comprising:
receiving, by the network security monitor via the first computer network, a first threat indicator from a first repository in a first format;
receiving, by the network security monitor via the first computer network, a second threat indicator from a second repository in a second format, the first repository different from the second repository, the first format different from the second format; and
transforming, by the network security monitor, the first threat indicator and the second threat indicator to the list of threat indicators based on the schema.

5. The method of claim 1, further comprising:
initiating, by the network security monitor, responsive to receiving at least one of an update to the list of threat indicators or a new log of the second computer network, the comparing by the log correlation engine.

6. The method of claim 1, further comprising:
searching, by the log correlation engine, for a correlation between the indexed logs of the second computer network; and
identifying, by the log correlation engine, a match based on the correlation between the indexed logs and the list of threat indicators.

7. The method of claim 1, further comprising:
identifying, by the log correlation engine, a portion of the plurality of logs as corresponding to a first type of the log format;
identifying, by the log correlation engine, a threat indicator of the list of the threat indicators corresponding to the first type; and
comparing, by the log correlation engine, the portion of the plurality of logs with the threat indicator to identify a match.

8. The method of claim 1, further comprising:
comparing, by the log correlation engine, historical logs and current logs with the one or more threat indicators to identify a match.

9. The method of claim 1, further comprising:
initiating, by the log correlation engine responsive to identifying a match based on the comparing, the report engine to generate the report.

10. The method of claim 1, wherein the second computer network is a secure network configured to block unauthorized access.

11. The method of claim 1, wherein:
the plurality of logs include a compilation of logs generated by the monitoring agent, the monitoring agent including at least one of an antivirus tool, a network security element, an intrusion prevention system, or an intrusion detection system; and
the plurality of logs include at least one of a general system log, a network security log, an intrusion prevention system log, an intrusion detection system log, or an antivirus application log.

12. The method of claim 1, wherein the log format includes at least two of a threat log mapping, a traffic log mapping, an email log mapping, a performance log mapping, an AAA log mapping, a VPN log mapping, or an access control log mapping.

13. The method of claim 1, further comprising:
inputting, by the network security monitor via an interface, the indexed logs in memory configured with a data structure corresponding to the indexed logs.

14. The method of claim 1, further comprising:
transmitting, by the network security monitor, the report via the first computer network to an administrator device associated with the second computer network.

15. A system for management of security on network infrastructure, comprising:
a network security monitor comprising a hardware processor and memory;
a log collector configured on the network security monitor to receive, via a first computer network, a plurality of logs of a second computer network, the plurality of logs indicative of a status of the second computer network determined by a monitoring agent executing on the second computer network;

a log indexer configured on the network security monitor to generate indexed logs from the plurality of logs based on types of threat indicators;

the network security monitor configured to retrieve a list of threat indicators from a database based on a schema from a plurality of threat indicators received from a plurality of heterogeneous repositories via the first computer network, the plurality of threat indicators including at least one of an internet protocol (IP) address, a malware code sample, a malicious code sample, or an intrusion prevention system (IPS) signature;

a log correlation engine configured with a heuristic technique on the network security monitor to perform a comparison of the list of threat indicators with the indexed logs; and a report engine configured on the network security monitor to generate a report based on the comparison.

16. The system of claim 15, further comprising:

an aggregator of the network security monitor configured to receive one or more threat indicators from a plurality of heterogeneous sources via the first computer network; and a normalizer of the network security monitor configured to use the schema to transform the one or more threat indicators to the list of threat indicators, the list of threat indicators comprising structured information configured for use by the log correlation engine.

17. The system of claim 15, further comprising:

an aggregator of the network security monitor configured to:
  obtain a first configuration for accessing a first repository via the first computer network;
  obtain a second configuration for accessing a second repository via the first computer network;
  use the first configuration to establish a first connection with the first repository via the first computer network; and
  use the second configuration to establish a second connection with the second repository via the first computer network; and the network security monitor further configured to update, based on the schema, the list of threat indicators based on one or more threat indicators received from at least one of the first repository or the second repository.

18. The system of claim 15, wherein the network security monitor is further configured to:
  receive, via the first computer network, a first threat indicator from a first repository in a first format;
  receive, via the first computer network, a second threat indicator from a second repository in a second format, the first repository different from the second repository, the first format different from the second format; and
  transform the first threat indicator and the second threat indicator to the list of threat indicators based on the schema.

19. The system of claim 15, wherein the log correlation engine is further configured to:
  identify a portion of the plurality of logs as corresponding to a first type of the log format;
  identify one or more threat indicators of the list of the threat indicators corresponding to the first type; and
  compare the portion of the plurality of logs with the one or more threat indicators to identify a match.

20. The system of claim 15, wherein the log correlation engine is further configured to:
  initiate responsive to identifying a match based on the comparing, the report engine to generate the report.

* * * * *